(12) United States Patent
De Jagar et al.

(10) Patent No.: US 12,157,948 B2
(45) Date of Patent: Dec. 3, 2024

(54) ELECTRODES FOR DIVERGENT ELECTROLYTIC FLOW-THROUGH APPARATUSES

(71) Applicant: Hydrox Holdings Limited, Pretoria (ZA)

(72) Inventors: Cornelis Johannes De Jagar, Pretoria (ZA); Ivor Malcolm Gillespie, Johannesburg (ZA); Jason Raphael Cuomo, Roodepoort (ZA)

(73) Assignee: Hydrox Holdings Limited, Pretoria (ZA)

( * ) Notice: Subject to any disclaimer, the term of this patent is extended or adjusted under 35 U.S.C. 154(b) by 992 days.

(21) Appl. No.: 17/050,415

(22) PCT Filed: Apr. 23, 2019

(86) PCT No.: PCT/IB2019/053340
§ 371 (c)(1),
(2) Date: Oct. 23, 2020

(87) PCT Pub. No.: WO2019/207478
PCT Pub. Date: Oct. 13, 2019

(65) Prior Publication Data
US 2021/0238754 A1    Aug. 5, 2021

(30) Foreign Application Priority Data

Apr. 23, 2018   (ZA) .................................. 2018/02672
Sep. 5, 2018    (ZA) .................................. 2018/05934

(51) Int. Cl.
*C25B 11/031*   (2021.01)
*C25B 1/04*     (2021.01)
(Continued)

(52) U.S. Cl.
CPC .............. *C25B 11/031* (2021.01); *C25B 1/04* (2013.01); *C25B 9/70* (2021.01); *C25B 11/073* (2021.01); *C25B 15/08* (2013.01)

(58) Field of Classification Search
CPC .................................... C25B 9/17; C25B 1/04
See application file for complete search history.

(56) References Cited

U.S. PATENT DOCUMENTS 8,142,626 B2    3/2012  Sugimasa et al.
9,683,298 B2 *  6/2017  Anagnostopoulos ..... C25B 1/04
(Continued)

FOREIGN PATENT DOCUMENTS

WO    WO-2016084037 A1 *  6/2016  ............... C25B 1/06

OTHER PUBLICATIONS

International Search Report and Written Opinion regarding International Application No. PCT/IB2019/053340, dated Dec. 5, 2019.
(Continued)

*Primary Examiner* — Alexander W Keeling
(74) *Attorney, Agent, or Firm* — Dentons US LLP

(57) ABSTRACT

This invention relates to apparatuses, systems and methods for the production and separation of gases in membraneless liquid alkaline electrolysis, and particularly to electrodes and electrode assemblies for use in a divergent electrolytic flow-through apparatus. The apparatus according to the invention comprises an inlet chamber; first and second permeable electrodes each having first and second sides and defining an inner aperture surrounding the inner region, the first sides of the first and second electrodes arranged to face each other to define an electrode gap within the inlet chamber; a first electrolytic solution inlet into the outer region and a second electrolytic solution inlet into the inner region; a first outlet in fluid flow communication with the second side of the first electrode, and a second outlet in fluid
(Continued)

flow communication with the second side of the second electrode.

18 Claims, 11 Drawing Sheets

(51) Int. Cl.
    *C25B 9/70*         (2021.01)
    *C25B 11/073*     (2021.01)
    *C25B 15/08*      (2006.01)

(56) References Cited

U.S. PATENT DOCUMENTS

| | | | |
|---|---|---|---|
| 10,407,780 B2 * | 9/2019 | Murahara | H01M 10/36 |
| 2013/0337368 A1 | 12/2013 | Doyen et al. | |
| 2017/0081770 A1 * | 3/2017 | Esposito | C25B 11/031 |

OTHER PUBLICATIONS

International Preliminary Report on Patentability regarding International Application No. PCT/IB2019/053340, dated Oct. 27, 2020.

\* cited by examiner

ELECTRODES FOR DIVERGENT ELECTROLYTIC FLOW-THROUGH APPARATUSES

This application is a 371 National Stage application of International Application No. PCT/IB2019/053340, filed Apr. 23, 2019, which claims the benefit of, and priority to, South African application no. 2018/02672, Apr. 23, 2018 and South African application no. 2018/05934, filed Sep. 5, 2018 the entire contents of which are hereby incorporated by reference.

INTRODUCTION AND BACKGROUND

This invention relates to electrodes and electrode assemblies for use in divergent electrolytic flow-through apparatuses, and to systems, apparatuses and methods incorporating such electrodes and electrode assemblies. More particularly, the electrodes and electrode assemblies are adapted to facilitate efficient separation of hydrogen and oxygen gas produced through a process of liquid alkaline electrolysis, by utilising the apparatuses and/or systems in accordance with the methods.

Various apparatuses, systems and methods for production and separation of gases by way of electrolysis of an electrolytic solution, such as an alkaline solution or water, are known in the art.

These can generally be divided into two distinct classes. The first, more conventional class, utilises diaphragms (in the case of alkaline electrolysers) or membranes, such as proton exchange membranes (PEM) (in the case of acidic electrolysers) and anion exchange membranes (AEM) (in the case of alkaline electrolysers) to keep constituent gases having formed on the electrodes by means of the electrolysis separate. The second class requires no conventional membranes or diaphragms for the purpose of separation of constituent gases.

The disadvantages and shortcomings of diaphragms and membranes are well documented.

Membranes are typically of solid polymeric construction. Due to thermal and chemical decomposition, the gas impermeability, conductivity and longevity of membranes are limited.

The membrane itself is either alkaline or acidic and comprises solvated hydroxide ions or protons in its chemical make-up.

Membranes are characteristically limited in terms of their permissible current density thresholds, due, amongst others, to gas diffusion across the membrane at elevated current densities, large ohmic resistances due to a limitation in charge transfer of the polymeric structure and since membranes are conventionally arranged in direct contact with the electrode.

Uneven current distribution over the electrode surface (high current collection points resulting in hot spots) results in thermal degradation of the membrane. So too does exothermic catalytic re-combination of H2 and O2 (which is caused by nanoscopic pores in the membrane) cause thermal degradation of the membrane.

Conventional diaphragms comprise porous barriers through which current carrying ions naturally diffuse. Due to high porosity, a risk of explosive mixtures of gas forming increases, limiting the current density at which electrolytic cells incorporating diaphragms could be operated.

Diaphragms furthermore need to be capable of complete wetting to develop ion conducting pathways therethrough. The pathways, however, need to be small enough to inhibit gas cross over. Pressure differentials across diaphragms therefore also have to be limited to prevent gas permeation issues. This also holds true for membranes.

Historically, diaphragms used in alkaline water electrolysis, contained asbestos. The use of hydrophobic polymers in diaphragms (such as Polypropylene (PP) and Poly-tetra-flouro-ethylene (PTFE)), as alternatives for asbestos, makes wetting difficult, and consequently, of late, membranes are preferred over diaphragms. To supplement asbestos containing diaphragms, membranes such as Nafion and Zirfon have been introduced.

A defining characteristic shared by membranes and diaphragms, is their impermeability to liquids and small gas bubbles. Both the channel size and permissible differential pressure over a diaphragm are limited.

Diaphragms and membranes are associated with increased system and operational costs, complexity, maintenance requirements and are of limited lifespan. Diaphragm and membrane failure results in cross-gas contamination.

The limited current density threshold of membranes and diaphragms limits gas production rates per unit area of electrode. A super-saturation of produced gas bubbles and dissolved gases on the surfaces of the electrodes results in a blockage of reactive surface area and limits the operating performance of these systems.

The limited lifespan of diaphragms and membranes can further be attributed to their brittleness and an inability to withstand aggressive conditions and temperatures. At high operating pressures, the rate of chemical degradation of PEMs is known to increase. Furthermore, a trade-off between diaphragm or membrane thickness, ionic conductivity or ohmic resistance and cross-gas contamination needs to be found. Also, diaphragms and membranes are prone to rupture when exposed to high pressure differentials. Current densities can furthermore not be fluctuated rapidly, as this can create large pressure imbalances, which may cause rupture as mentioned.

In a bid to overcome the aforementioned shortcomings, it has become an objective to develop electrolytic systems, cells, apparatuses and methods, in which diaphragms and membranes are omitted. This led to the development of the second class of electrolysis apparatuses and methods. To date, no commercially available membraneless systems have been developed. Experimental membraneless technologies incorporating large electrode gaps tend to suffer from current density threshold limitations and severe cross-gas contamination, and typically require large parasitic loads for effective operation.

The first effective means of producing and separating gases by way of a membraneless system has recently been invented by Anagnostopoulos, an inventor in the service of the current applicant. U.S. Pat. No. 9,683,298 B2 ("referred to as Patent '298") was issued in respect of this invention on 20 Jun. 2017 and is incorporated in its entirety herein by reference. Patent '298 teaches of an apparatus for the production and separation of gases by way of electrolysis, by diverging a stream of electrolytic solution between first and second permeable electrodes, resulting in a first and second stream of bi-phase fluid passing through the first and second electrodes respectively, into first and second outlets. These first and second streams effectively remove constituent gases from the first and second electrodes, thereby separating the first and second constituent gases without the need of diaphragms or membranes. Due to the continuous flow of electrolytic solution, constituent gases are removed from the surfaces of the electrodes, resulting in the elimination of concentration gradients forming at the surfaces of the electrodes and supersaturated conditions close to the electrode surfaces.

The driving force of the separation of the constituent gases in the '298 patent therefore, is the positive flow of the two diverging streams of electrolytic solution through the opposing permeable electrodes. The applicant has however found, that at optimal fluid flow rates, a fluid path length (defined as the maximum path length of electrolytic solution along a surface of an electrode) needs to be restricted, and therefore, the diameter of the electrodes was limited to 20 mm. The optimal fluid flow rate in this regard, was determined by the amount of flow required to ensure proper separation of the constituent gases and acceptable gas purity rates, whilst preventing "dead spots" on the electrode surface. At flow rates below optimal, a build-up of constituent gases starts forming on the surfaces of the respective electrodes, within the electrode gap.

This build-up reduces the active area of the electrodes, and if left unremoved, continues to grow in size until the build-up from the two electrodes becomes large enough for the gases to cross-pollute.

Scalability of the invention of the '298 patent proved challenging, due to inconsistent flow distribution, especially towards the centre of the electrodes, associated with increased fluid path lengths, resulting in low gas purities and a build-up of gas within the electrode gap.

When arranging a large number of electrode pairs in an array within a single inlet chamber, it was found that inconsistent flow distribution to the respective electrode pairs and a build-up of gases between the electrodes resulted in low levels of gas purity. Non-preferential, steady-state circumferential flow could therefore not be achieved at all the respective electrode pairs.

Furthermore, the pumping requirements to reach the optimal flow rate resulted in a large parasitic load, hindering the efficiency of the gas production system.

A need therefore arises in the production and separation of constituent gases in accordance with the second class, in other words, specifically without the use of diaphragms or membranes, to increase gas production volumes per unit area. Simultaneously, a need arises to increase the purity of constituent gases thus produced, whilst minimising flow rates of electrolytic solution and consequently parasitic loads.

OBJECT OF THE INVENTION

Accordingly, it is an object of the present invention to provide an electrode, an electrode assembly and an electrolytic apparatus, system and method incorporating said electrode and/or electrode assembly, for producing and separating gases, at high levels of purity, with which the applicant believes the aforementioned disadvantages may be alleviated or which may provide a useful alternative for the known electrodes, electrode assemblies, apparatuses, systems and methods.

SUMMARY OF THE INVENTION

According to a first aspect of the invention, there is provided an apparatus for the production and separation of gases, by electrolysis of an electrolytic solution, the apparatus comprising:

an inlet chamber comprising an inner and outer region;
first and second permeable electrodes each having first and second sides and defining an inner aperture surrounding the inner region, the first sides of the first and second electrodes arranged to face each other to define an electrode gap within the inlet chamber;
a first electrolytic solution inlet into the outer region and a second electrolytic solution inlet into the inner region;
a first outlet in fluid flow communication with the second side of the first electrode, and a second outlet in fluid flow communication with the second side of the second electrode,
so that, in use, a first peripheral flow of electrolytic solution ensues from the outer region into the electrode gap, and a second peripheral flow of electrolytic solution ensues from the inner region into the electrode gap, thereby immersing the electrodes in electrolytic solution, so that operatively, first and second constituent gases form on the first and second electrodes respectively, and wherein, in use, electrolytic solution within the electrode gap diverges into first and second outlet streams that pass through the first and second electrodes respectively, thereby removing at least a portion of the first and second constituent gases from the first and second electrodes into the first and second outlets respectively.

The first and second electrodes may be in the form of a continuous band defining the inner aperture. Each of the first and second electrodes may comprise a substantially ring-shaped band, defined by an inner and an outer diameter. A radial extent of the band may be equal to, or below, 50 mm.

The facing first sides of the first and second electrodes may be arranged substantially parallel to each other. The electrode gap between the first sides of the first and second electrodes may be in the range of 1 mm to 6 mm, and may specifically be equal to 2.5 mm.

The first and second electrodes may be mounted to first and second non-conductive electrode housings located within an apparatus body, which electrode housings may comprise inner and outer formations defining a housing gap. The housing gap may be substantially equal to the electrode gap.

Outer surfaces of the inner and outer formations may have smooth surface finishes and may be arranged to be flush with the first sides of the electrodes. A length of the inner and outer formations may be selected to ensure that the flow of electrolytic solution is fully developed upon entering the electrode gap. An entry from the outer region of the inlet chamber into the outer formation of the electrode housing, and the entry from the inner region of the inlet chamber into the inner formation of the electrode housing, may be rounded to reduce turbulence of electrolytic solution flowing into the housing gap, in use.

The first and second electrodes may be mounted in contact with first and second current distributors respectively, which first and second current distributors may impart a positive and negative charge on the first and second electrodes respectively, to create a potential difference between the first and second electrodes.

A cross-sectional area of the first inlet may exceed a cross-sectional area of the second inlet, to facilitate a volumetric flow rate of electrolytic solution into the outer region of the inlet chamber to exceed the volumetric flow rate of electrolytic solution into the inner region of the inlet chamber.

Alternatively, more than one first inlet may be provided into the outer region of the inlet chamber, to facilitate a volumetric flow rate of electrolytic solution into the outer region of the inlet chamber to exceed the volumetric flow rate of electrolytic solution into the inner region of the inlet chamber.

The first and second outlets may be arranged in fluid flow communication with first and second outlet collectors respectively.

First and second outlet chambers may be provided in fluid flow communication with the first and second outlet collectors. First and second gas separators may furthermore be provided in the first and second outlet chambers respectively, to remove the first and second constituent gases from the first and second outlet streams respectively.

The first constituent gas may be hydrogen and the second constituent gas is oxygen. The electrolytic solution may be a neutral solution, an acidic solution, a brine solution, seawater or an alkaline electrolytic solution such as potassium hydroxide (KOH) or sodium hydroxide (NaOH).

The inlet chamber may be manufactured from polypropylene.

An operative top end of the inlet chamber may comprise a collection cavity for collecting constituent gases that operatively accumulate within the inlet chamber. A purge outlet may be provided in fluid flow communication with the collection cavity for removing the accumulated constituent gases from the collection cavity.

The apparatus may comprise a third inlet into the outer chamber, and a fourth inlet into the inner chamber. In use, a counter current flow of electrolytic solution may be established through the first and third inlets into the outer region. Both the second and fourth inlets may provide the inner region with a positive flow of electrolytic solution.

The outer region of the inlet chamber may comprise distribution channels, in use, to distribute electrolytic solution to different portions along a periphery of the first and second electrodes, to provide balanced flow of electrolytic solution along the periphery of the first and second electrodes.

The apparatus may furthermore comprise:
third and fourth permeable electrodes each having first and second sides and defining an inner aperture surrounding the outer region of the inlet chamber, the first sides of the third and fourth electrodes arranged to face each other to define a second electrode gap within the inlet chamber;
an outermost region of the inlet chamber surrounding the third and fourth electrodes;
a fifth inlet into the outermost region;
a third outlet in fluid flow communication with the second side of the third electrode, and a fourth outlet in fluid flow communication with the second side of the fourth electrode,
so that, in use, a third peripheral flow of electrolytic solution ensues from the outer region into the second electrode gap, and a fourth peripheral flow of electrolytic solution ensues from the outermost region into the second electrode gap, thereby immersing the third and fourth electrodes in electrolytic solution, so that in use the first and second constituent gases form on the third and fourth electrodes respectively, and wherein, in use, electrolytic solution within the second electrode gap diverges into third and fourth outlet streams that pass through the third and fourth electrodes respectively, thereby removing the first and second constituent gases from the third and fourth electrodes into the third and fourth outlets respectively.

The apparatus according to the first aspect of the invention may furthermore comprise a non-conductive permeable layer arranged over the first side of the first permeable electrode, wherein, in use, the non-conductive permeable layer may inhibit the first constituent gas, having formed on the first electrode, from migrating into the electrode gap.

Furthermore, a second non-conductive permeable layer may be arranged over the first side of the second permeable electrode. In use, the second non-conductive permeable layer may inhibit the second constituent gas, having formed on the second electrode, from migrating into the electrode gap.

According to a second aspect of invention there is provided an electrode assembly operatively forming part of a pair of opposing electrode assemblies of an apparatus utilised for the production and separation of constituent gases from an electrolytic solution by means of electrolysis, with an electrode gap operatively defined between the pair of opposing electrode assemblies, the electrode assembly comprising:
a permeable electrode of an electrically conducting material, having first and second opposing sides, wherein in use, the electrode is arranged over a first outlet of the apparatus, such that the first side faces towards the electrode gap, and the second side faces towards the first outlet; and
a non-conductive permeable layer arranged over the first side of the permeable electrode,
wherein, in use, the non-conductive permeable layer inhibits a first constituent gas, having formed on the first electrode, from migrating into the electrode gap.

The non-conductive permeable layer may comprise a non-conductive permeable sheet. The non-conductive permeable layer or sheet may be permeable to liquids and gases.

The non-conductive permeable layer may have a well-defined aperture structure.

The permeable electrode may be manufactured from a base material such as titanium, nickel, carbon, cobalt, platinum, any one of the platinum group metals (PGMs), aluminium, ferrous alloys, or an alloy or combination of the aforementioned.

At least a portion of an outer surface of the electrode may comprise a layer of a catalytic material, which catalytic material may comprise one of titanium; nickel; carbon; cobalt; platinum; any one of the platinum group metals (PGMs); aluminium; ferrous alloys; and an alloy, combination or oxide thereof.

The outer layer may be formed by way of known methods such as electrodeposition of the catalytic material onto the base material, spray coating, dip coating, vapour deposition, or vacuum metallization.

The permeable electrode may be foraminous, porous, or perforated and may have an aperture rating between 25 and 200 μm.

Typically, the permeable electrode may have an aperture rating exceeding 80 μm.

The electrode may comprise one of: i) an alternate mesh weave; ii) an electroformed mesh; and iii) a resolving filtration mesh.

The mesh weave may comprise one of: i) a straight weave; ii) a plain weave; iii) Dutch weave; iv) twilled weave; and v) a combination thereof.

The permeable electrode may comprise a multi-layered filtration mesh.

The permeable electrode may comprise one of i) a metal foam; and ii) a combination of a mesh and a metal foam.

The permeable electrode may be circular, rectangular, square, or in the form of a continuous band defining an inner aperture, which may be ring-shaped, rectangular, square or oval.

The non-conductive permeable layer may be manufactured from a plastics or polymeric material, selected from the list comprising Nylon, polytetrafluoroethylene (PTFE), polypropylene (PP), high-density polyethylene (HDPE) and polyvinyl chloride (PVC).

an aperture rating of the non-conductive permeable layer may be between 5 and 75 μm, and may typically be 25 μm.

The aperture rating of the non-conductive permeable layer may be smaller than an aperture rating of the electrode.

The non-conductive permeable layer may have a thickness of between, 50 and 85 μm thick, and preferably, between 66 and 78 μm thick.

A size of the non-conductive permeable layer may be such that it covers the first side of the electrode.

The non-conductive permeable layer may be fixed relative to the electrode in use, by a lock ring which stretches the non-conducting permeable layer over the electrode, and into contact with the electrode.

According to a third aspect of the invention there is provided an apparatus for the production and separation of gases, by electrolysis of an electrolytic solution, the apparatus comprising:
   an inlet chamber for operatively receiving electrolytic solution through an inlet;
   first and second permeable electrodes each having first and second sides, the first sides of the first and second electrodes arranged to face each other to define an electrode gap therebetween;
   a first non-conductive permeable layer arranged over the first side of the first permeable electrode, the first non-conductive permeable layer and first electrode collectively constituting a first electrode assembly;
   first and second outlets in fluid flow communication with the second sides of the first and second electrodes respectively,
so that, in use, electrolytic solution within the electrode gap diverges into first and second outlet streams that pass through the first and second electrodes respectively into the first and second outlets respectively, wherein, upon supplying a potential difference over the first and second electrodes, first and second constituent gases form on the first and second electrodes respectively, whereafter at least a portion of the first and second constituent gases are removed from the first and second electrodes into the first and second outlets by the first and second outlet streams respectively, and wherein the first non-conductive permeable layer inhibits the first constituent gas having formed on the first electrode from migrating into the electrode gap.

In use, a gap may be defined between the non-conductive sheet and a second electrode forming part of the pair of opposing electrode assemblies.

The aperture rating of the non-conductive permeable sheet may be selected according to a bubble size classification of the constituent gas operatively forming on the electrode, and may be smaller than an average or majority size of evolved bubbles operatively forming on the electrode.

The facing first sides of the first and second electrodes may be arranged substantially parallel to each other, and wherein the electrode gap may in the range of 1 mm to 6 mm, and typically around 2.5 mm.

A second non-conductive permeable layer may be arranged over the first side of the second permeable electrode, so that the second non-conductive permeable layer and the second electrode collectively constitutes a second electrode assembly, which may be substantially similar to the first electrode assembly.

The first and second electrodes may be mounted to first and second non-conductive electrode housings located within an apparatus body.

The first and second electrodes may be mounted in contact with first and second current distributors respectively. Operatively, the first and second current distributors may impart a negative and positive charge on the first and second electrodes respectively, to create a potential difference between the first and second electrodes.

The first and second electrodes may constitute an electrode pair. The apparatus may comprise a stack of a plurality of electrode pairs.

The first and second electrodes may be mounted to bipolar plates. A potential difference may be applied to endplates of the stack.

The first constituent gas may be hydrogen and the second constituent gas may be oxygen. The electrolytic solution may be a neutral solution, an acidic solution, a brine solution, seawater, or an alkaline electrolytic solution, such as potassium hydroxide (KOH) or sodium hydroxide (NaOH).

The inlet chamber may be manufactured from a non-conductive polymeric material, typically such as polypropylene.

The first and second outlets may be arranged in fluid flow communication with first and second outlet collectors, the sizes of which may be such that, in use, an electrolytic solution pressure within the outlet collectors remains below an electrolytic solution pressure within the inlet chamber, so that a pressure drop or differential is defined over each of the first and second electrodes.

A first and second gas separator may be provided in the first and second outlet collectors respectively, to remove the first and second constituent gases from the first and second outlet streams respectively.

The inlet chamber may surround the first and second electrodes, so that in use, the first and second electrodes are immersed in electrolytic solution, and so that operatively, an outer peripheral stream of electrolytic solution flows into the electrode gap from the inlet chamber, before diverging into the first and second outlet streams.

An outer shape of the first and second electrodes is circular, oval or rectangular.

Each of the first and second electrodes may define an inner cavity. A second inlet may be provided to, in use, supply electrolytic solution into the inner cavity and so that an inner peripheral stream of electrolytic solution operatively flows from the inner cavity into the electrode gap.

Alternatively, each of the first and second electrodes may define an inner cavity while the inlet chamber may be defined within the inner cavity of the first and second electrodes, so that an inner peripheral stream operatively flows from the inner cavity into the electrode gap. In such a case, no outer peripheral stream may be required.

An operative top end of the inlet chamber may comprise a collection cavity for collecting constituent gases that operatively accumulate within the inlet chamber. A purge outlet may be provided in fluid flow communication with the collection cavity for removing the accumulated constituent gases from the collection cavity.

According to a fourth aspect of the invention there is provided a method for production and separation of gases, by electrolysis of an electrolytic solution, the method comprising:
   supplying a first stream of electrolytic solution through a first inlet into an inner region of an inlet chamber of an electrolysing apparatus, which inner region is surrounded by a first and second permeable electrode defining an electrode gap, so that a first peripheral flow of electrolytic solution ensues from the inner region into the electrode gap;

supplying a second stream of electrolytic solution through a second inlet into an outer region of the inlet chamber, which outer region surrounds the first and second electrodes, so that a second peripheral flow of electrolytic solution ensues from the outer region into the electrode gap;

diverging the electrolytic solution within the electrode gap into a first outlet stream that passes through the first permeable electrode and a second outlet stream that passes through the second permeable electrode;

providing a potential difference over the first and second electrodes so that electrolysis of the electrolytic solution ensues, and so that a first constituent gas forms on the first electrode, and a second constituent gas forms on the second electrode; and removing at least a portion of the first and second constituent gases from the first and second electrodes into first and second outlets by means of the first and second outlet streams.

A volumetric flow rate of electrolytic solution into the outer region through the first inlet may exceed a volumetric flow rate of electrolytic solution into the inner region through the second inlet by a volumetric flow factor, which may be equal to a ratio of an outer peripheral length of the electrode, to an inner peripheral length of the electrode.

An average flow velocity of the electrolytic solution through a cross sectional front face of each of the first and second electrodes may be maintained within the range of 0.05 to 0.25 m·s$^{-1}$.

The average flow velocity of the electrolytic solution through the cross sectional front face of each of the first and second electrodes may be maintained at 0.075 m·s$^{-1}$.

A flow velocity of electrolytic solution in the first and second inlets may be maintained within a range of 0.5 and 2 m·s$^{-1}$.

The flow velocity of electrolytic solution in the first and second inlets may be maintained at around 1.1 m·s$^{-1}$.

A flow velocity of the first peripheral flow of electrolytic solution may be substantially equal to a flow velocity of the second peripheral flow of electrolytic solution.

An electrolytic fluid pressure inside the outer region may match an electrolytic fluid pressure inside the inner region.

The method according to the fourth aspect of the invention may comprise the further step of collecting and storing the separated first and second constituent gases.

The potential difference provided to the first and second electrodes may be pulsed to facilitate the removal of the first and second constituent gases from the first and second electrodes respectively.

According to a fifth aspect of the invention there is provided an electrolysing apparatus for the production and separation of gases, comprising:

first and second spaced apart electrodes at least partially immersed in an inlet chamber;

at least a first inlet for passing electrolytic solution into the inlet chamber, where electrolysis takes place upon the application of a potential difference across the electrodes, so that a first constituent gas forms on the first electrode and a second constituent gas forms on the second electrode;

a collection chamber within the inlet chamber for collecting any portion of the first and second constituent gases remaining in the inlet chamber in use; and a purge outlet for in use removing the portion of the first and second constituent gases from the collection chamber.

The first and second electrodes may be substantially parallel and foraminous electrodes, completely immersed in the inlet chamber. The inlet chamber may surround the first and second electrodes.

The apparatus may be configured such that the electrolytic solution diverges into first and second outlet streams between the electrodes such that the first outlet stream passes through the first electrode thereby removing at least a portion of the first constituent gas from the first electrode as the first outlet stream passes into a first combustible fluid outlet. Furthermore, the second outlet stream may pass through the second electrode thereby removing at least a portion of the second constituent gas from the second electrode as the second outlet stream passes into a second combustible fluid outlet.

The collection chamber may be utilised for collecting any remaining portion of the first and second constituent gases not separated into the first and second combustible fluid outlets.

According to a sixth aspect of the invention there is provided a method for production and separation of gases, by electrolysis of an electrolytic solution, the method comprising:

supplying electrolytic solution through an inlet into an inlet chamber of an electrolysing apparatus, which apparatus comprises first and second permeable electrodes each having first and second sides, the first sides of the first and second electrodes arranged to face each other to define an electrode gap therebetween, and allowing the electrolytic solution to enter the electrode gap;

diverging the electrolytic solution within the electrode gap into a first outlet stream that passes through the first permeable electrode into a first outlet of the apparatus and a second outlet stream that passes through the second permeable electrode into a second outlet of the apparatus;

providing a potential difference over the first and second electrodes so that electrolysis of the electrolytic solution ensues, and so that a first constituent gas forms on the first electrode, and a second constituent gas forms on the second electrode;

inhibiting the first constituent gas from migrating into the electrode gap by means of a first non-conductive permeable sheet arranged over the first side of the first electrode; and removing the first and second constituent gases from the first and second electrodes into the first and second outlets by means of the first and second outlet streams.

The first and second outlet streams may have a flow velocity through the first and second electrodes respectively, of between 0.0001 and 0.012 m/s.

The electrolytic solution within the electrode gap may be maintained at a temperature ranging between 30 and 150 degrees Celsius.

The electrolytic solution within the inlet chamber may maintained at a pressure between atmospheric pressure and 30 bar.

A pressure within the first and second outlets may be maintained below the pressure of the electrolyte within the inlet chamber, so that a pressure differential may be maintained over the first and second electrodes respectively.

Further according to the sixth aspect of the invention, the provision of the potential difference to the first and second electrodes may be pulsed to further facilitate the removal of the first and second constituent gases from the first and second electrodes respectively.

The pulsing of the potential difference over the first and second electrodes may be utilised to remove accumulated gas bubbles from the electrode gap into the inlet chamber.

According to a seventh aspect of the invention there is provided a system for the separation and production of gases, comprising a stack formed by a plurality of apparatuses according to the third aspect of the invention.

Preferably, the stack may comprise a filter press design.

The first and second outlets of each respective apparatus forming part of the stack may be connected via a first and second manifold respectively, to a main first outlet of the stack and a main second outlet of the stack.

BRIEF DESCRIPTION OF THE DRAWINGS

The invention will now be described further by way of non-limiting examples with reference to the accompanying drawings wherein.

DESCRIPTION OF PREFERRED EMBODIMENTS OF THE INVENTION

Figure 1:
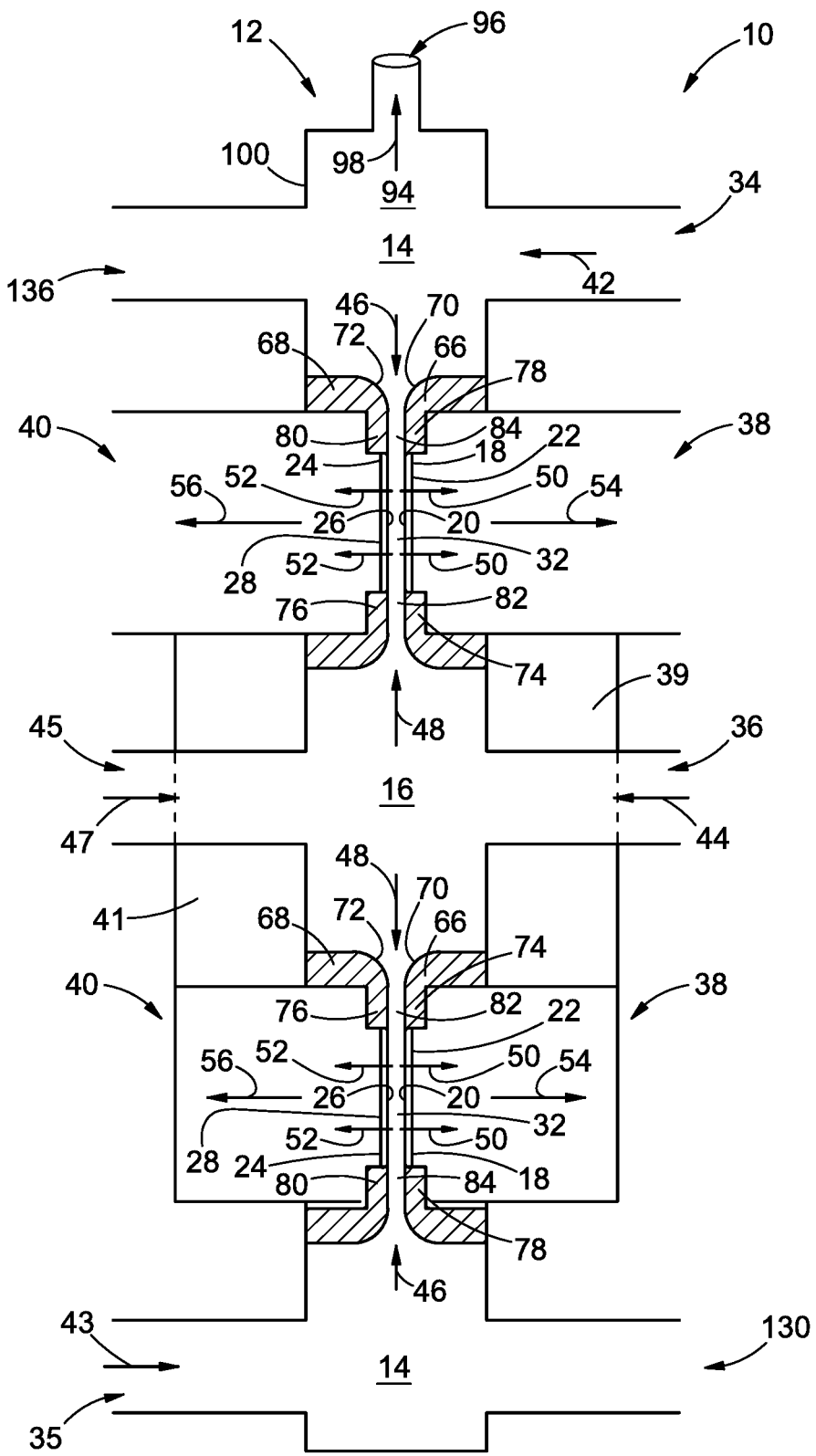
FIG. 1 is a diagrammatic section view of an inlet chamber of an example electrolysing cell or apparatus according to the invention, and comprising a first pair of opposing first and second electrodes.
Figure 2:
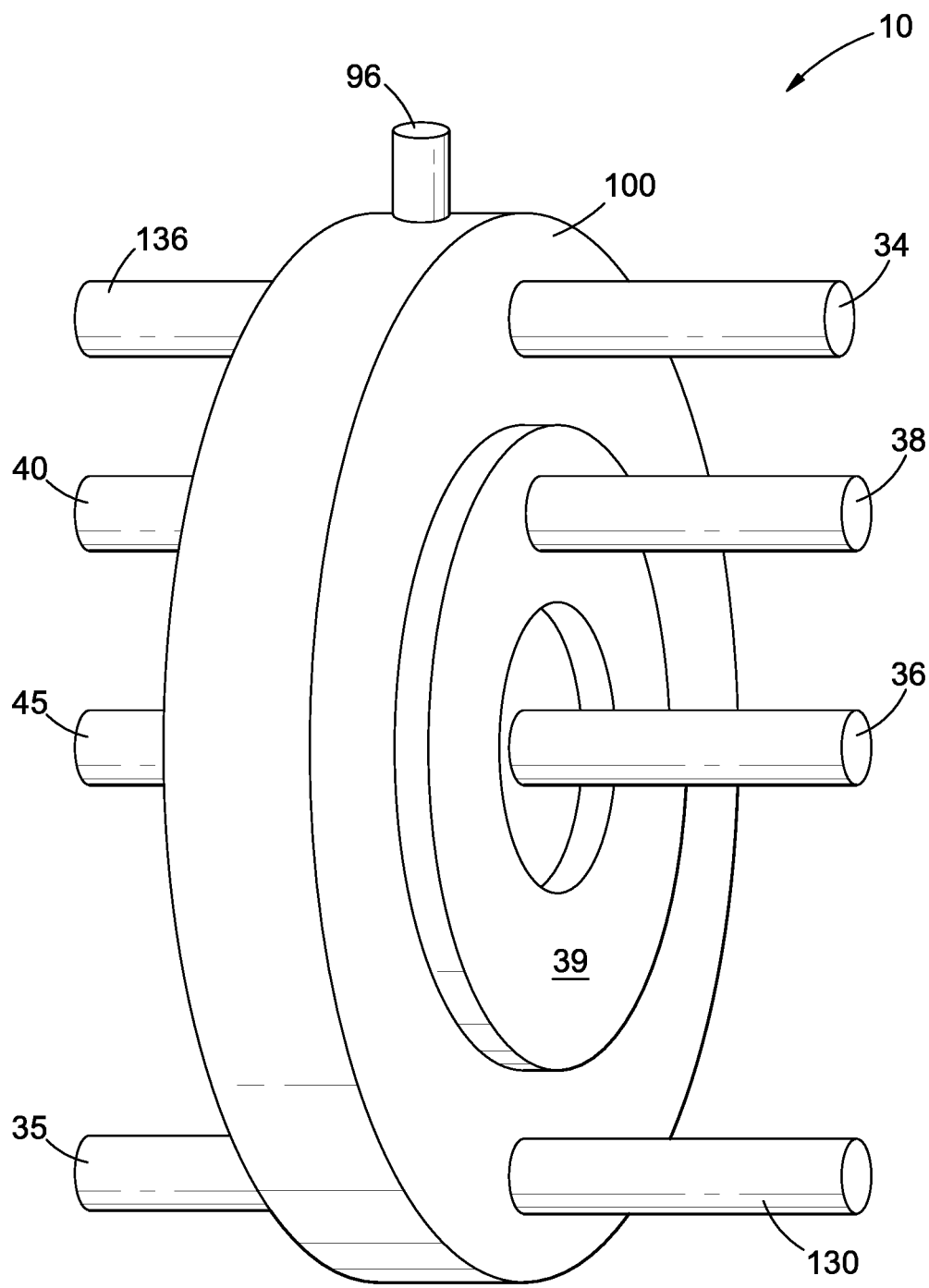
FIG. 2 is perspective view of the electrolysing apparatus of FIG. 1.
Figure 3:
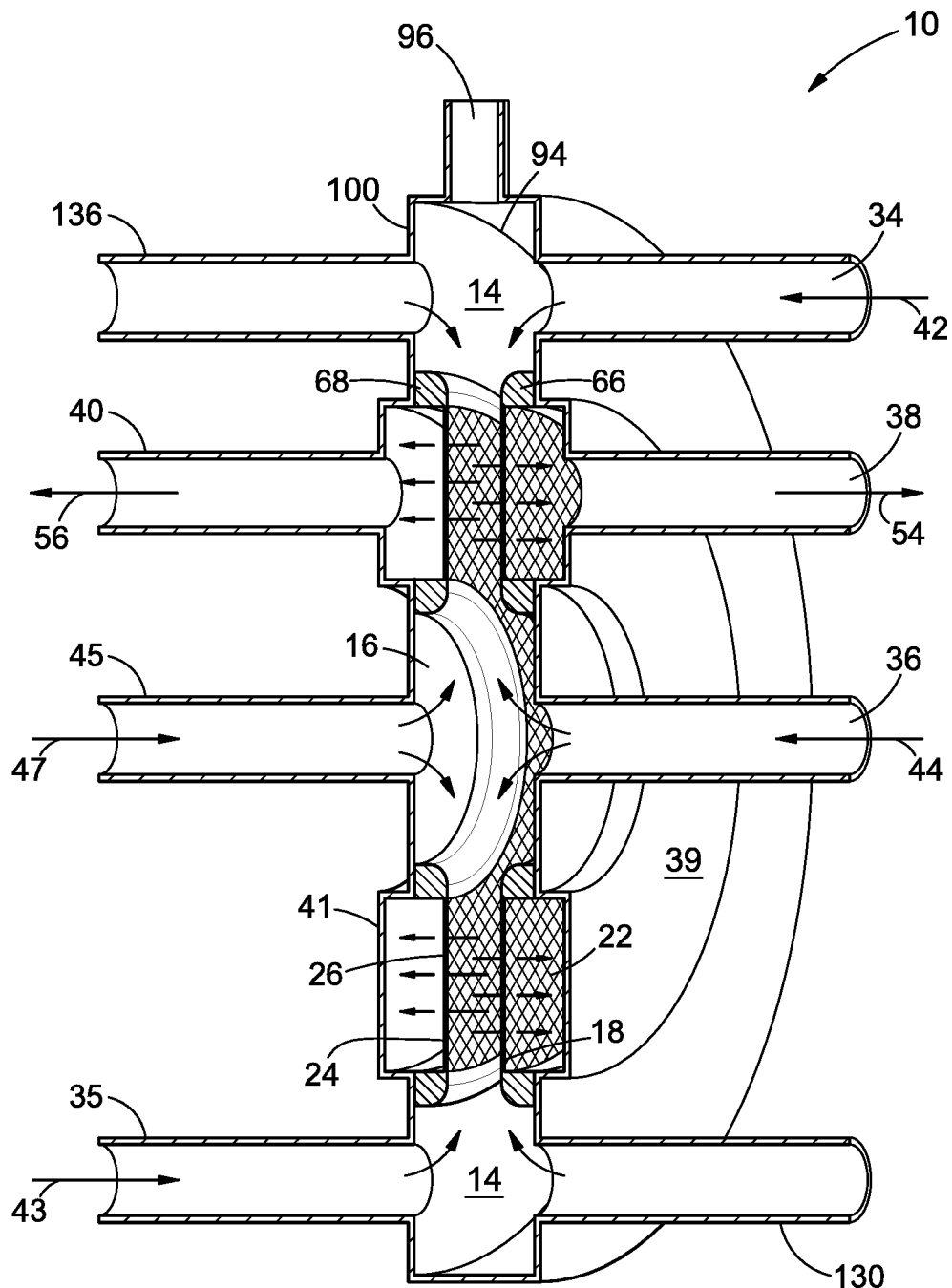
FIG. 3 is perspective section view of the electrolysing apparatus of FIG. 1.

The applicant realised that the only way to achieve commercially viable gas production rates would be by increasing the electrode surface area within the inlet chamber, without increasing the path length of electrolytic solution flowing over the electrode.

A first attempt at increasing the electrode surface area, was to provide an elongate electrode within an inlet chamber. However, it was found that corners of the electrodes resulted in a termination of the fluid path, which inevitably caused areas of negligible flow. A corner also potentially introduces an area of high turbulence, which is undesirable. These areas cause points of high pressure, generally associated with lower flow velocities, allowing bubbles to accumulate in the upper regions of the flow path. This creates a condition of cross gas contamination and non-uniform current density distributions. Further development led to the embodiment of the invention that is described below.

An electrolysing apparatus or cell for the production and separation of gases by electrolysis of an electrolytic solution is generally indicated with reference numeral 10 in the accompanying drawings.

The electrolysing cell 10 comprises an inlet chamber 12 comprising an outer region 14 and an inner region 16. The electrolysing cell 10 further comprises a first electrode 18 having a first side 20 and a second side 22, and second electrode 24 having a first side 26 and a second side 28. Each of the first and second electrodes (18, 24) defines an inner aperture 30 (shown best on FIG. 4) that surrounds the inner region 16. The first sides (20, 26) of the first and second electrodes (18, 24) are arranged to face each other to define an electrode gap 32 within the inlet chamber 12.

A first inlet 34 is provided to feed electrolytic solution into the outer region 14, whilst a second inlet 36 is provided to feed electrolytic solution into the inner region 16. A first outlet 38 is provided in fluid flow communication with the second side 22 of the first electrode 18, whilst a second outlet 40 is provided in fluid flow communication with the second side 28 of the second electrode 24.

In the figures, streams of fluids are indicated by arrows, with the direction of flow of the stream of fluid in the direction of the arrowhead. In use, a first stream of electrolytic solution 42 is fed via the first inlet 34 into the outer region 14, so that the outer region 14 is completely filled with electrolytic solution. A second stream of electrolytic solution 44 is fed via the second inlet 36 into the inner region 16, so that the inner region 16 is completely filled with electrolytic solution. A first peripheral stream or flow of electrolytic solution 46 ensues from the outer region 14 into the electrode gap 32, whilst a second peripheral stream or flow of electrolytic solution 48 ensues from the inner region 16 into the electrode gap 32, so that the first and second electrodes (18, 24) become completely submerged in electrolytic solution within the inlet chamber 12. Therefore, in use, the whole inlet chamber 12 is filled with electrolytic solution.

A potential difference is applied over the first and second electrodes (18, 24), so that electrolysis of the electrolytic solution ensues on the electrodes, causing a first constituent gas to form on the first electrode 18, and a second constituent gas to form on the second electrode 24. The first and second constituent gases that form on the first and second electrodes (18, 24) are initially in the form of nano- or microbubbles, that eventually coalesce into larger bubbles. The constituent gases are not indicated in the drawings.

The electrolytic solution within the inlet chamber 12 is kept at positive pressure. In use, the first and second streams of electrolytic solution (42, 44) continuously flow into the first and second inlets (34, 36) respectively. Since the first and second electrodes are permeable, the electrolytic solution within the electrode gap 32 diverges into a first outlet stream 50 of electrolytic solution that passes through the first electrode 18 and a second outlet stream 52 of electrolytic solution that passes through the second electrode 24. The first outlet stream 50 of electrolytic solution that passes through the first electrode 18 removes at least a portion of the first constituent gas from the first electrode 18 and into the first outlet 38, so that a first bi-phase stream 54 of electrolytic solution and the first constituent gas flows through the first outlet 38. Similarly, the second outlet stream 52 of electrolytic solution that passes through the second electrode 24 removes at least a portion of the second constituent gas from the second electrode 24 and into the second outlet 40, so that a second bi-phase stream 56 of electrolytic solution and the second constituent gas flows through the second outlet 40.

The divergence of the first and second outlet streams (50, 52) of electrolytic solution, and the positive and continuous flow of these streams through the first and second electrodes (18, 24) respectively, facilitates the effective separation of the first and second constituent gases after being formed on the first and second electrodes (18, 24) respectively, without the need for a diaphragm or membrane.

The first and second electrodes (18, 24) are preferably manufactured from a base metal such as titanium, nickel, carbon, cobalt, platinum, platinum group metals (PGMs), aluminium, ferrous alloys (such as steel or stainless steel), or an alloy or combination of any of these base materials.

The base metal may furthermore be provided with an outer layer (not shown) of a suitable catalytic material. The outer layer is formed on the base metal by way a known method, such as electrodeposition, spray or dip coating, vapour deposition or vacuum metallization.

The first and second permeable electrodes (18, 24) are foraminous, porous or perforated. The first and second electrodes (18, 24) have a nominal micron rating between 25 and 200 μm. The electrodes comprise an alternate filtration mesh weave, an electroformed mesh or a resolving filtration mesh. The mesh may be weaved in the form of a straight weave, plain weave, twilled weave, Dutch weave or a combination thereof. Alternatively, the first and second electrodes may be in the form of a metal foam.

Preferably, the mesh weaves are in the form of a multi-layered, such as a double- or triple-layered 200 μm nominal rating normal Dutch weave filtration mesh. Electrodes comprising a single, or more than two layers are however feasible. Electrodes comprising three layers may be provided to increase the effective electrode surface area.

The first and second electrodes may be in the form of a continuous band defining/surrounding the inner aperture.

Figure 4:
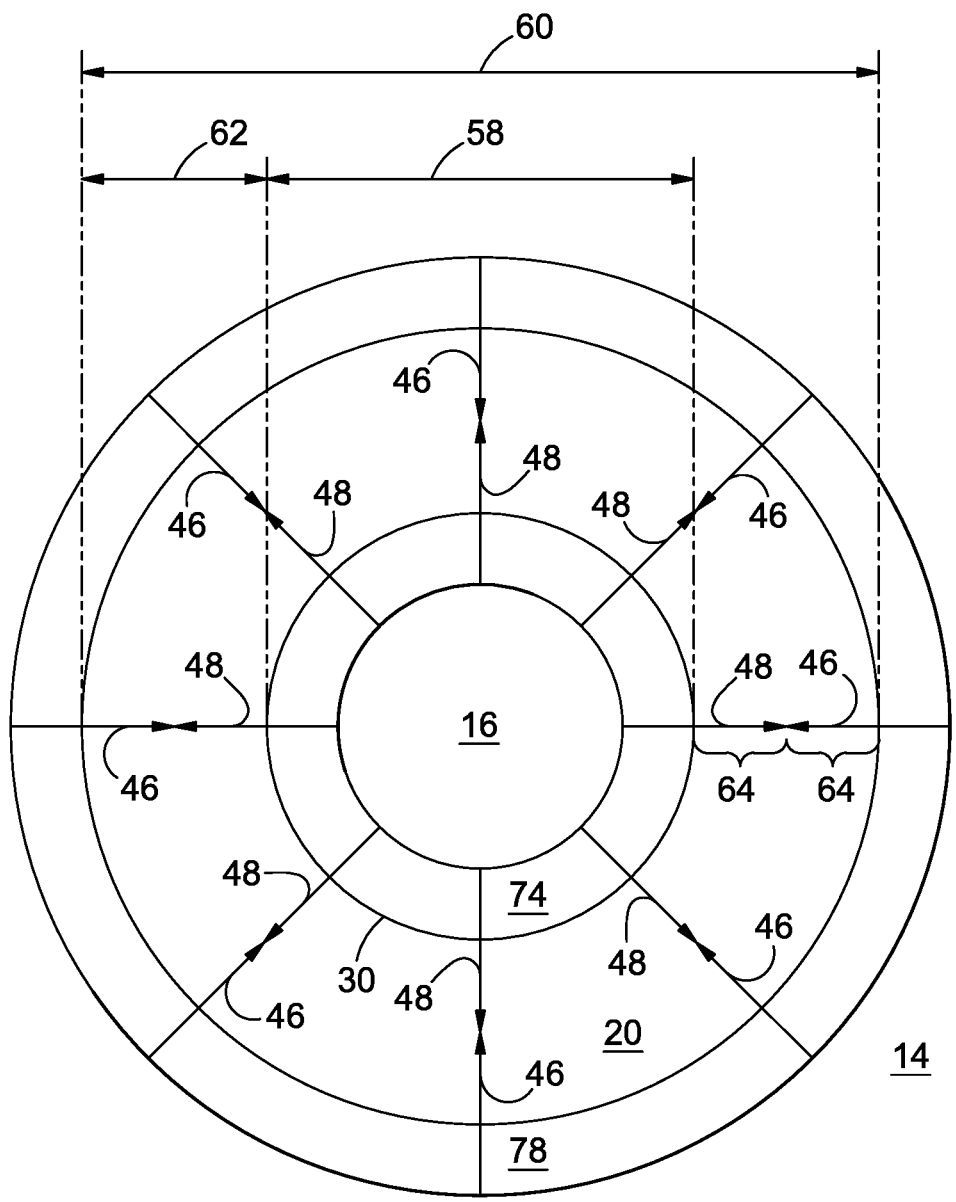
FIG. 4 is front view of a ring-shaped electrode and electrode housing of the electrolysing apparatus of FIG. 1.

As is best illustrated in FIG. 4, the first sides (20, 26) of the first and second electrodes (18, 24) comprise ring-shaped bands, defined by an inner diameter 58 and an outer diameter 60. In the current example embodiment, a radial extent 62 (and therefore a difference between inner and outer radii) of the electrode is 50 mm or smaller.

The applicant has found that, at an optimal fluid flow velocity, in the current example embodiment of the invention, the path length of the electrolytic solution should not exceed 25 mm, to ensure the efficiency of the cell 10. For the purpose of this disclosure, "path length" is defined as the path, parallel to the electrode, along which the electrolytic solution flows within the electrode gap 32. The permissible path length is determined by amongst others, the flow velocity of electrolytic solution, the electrolytic solution pressure within the inlet chamber 12, the electrode gap 32 etc.

The first and second peripheral streams of electrolytic solution (46, 48) predominantly flows in a radial direction into the electrode gap. By providing the first peripheral stream 46 from the outer region 14 into the electrode gap 32 and a second peripheral stream 48 from the inner region 16 into the electrode gap 32, the path length 64 of any one of the first and second peripheral streams (46, 48) is limited to half the radial extent 62. By limiting the radial extent 62 to 50 mm, the maximum path length 64 is therefore limited to 25 mm.

If circular electrodes were to be used, and the path length were to be limited to 25 mm, the diameter of the electrodes would therefore be limited to 50 mm. However, since the first and second electrodes (18, 24) are ring-shaped, the electrode surface areas of the first and second electrodes (18, 24) significantly exceed that of circular electrodes. This has a direct impact on the gas production volume of the cell 10 and is required for viable large-scale gas production.

The outer diameter 60 is theoretically not limited.

The facing first sides (20, 26) of the first and second electrodes (18, 24) may be arranged substantially parallel to each other.

The electrode gap 32 between the first sides of the first and second electrodes (18, 24) may be in the range of 1 mm to 6 mm. Preferably, the electrode gap is 2.5 mm. A gap of 2.5 mm allows sufficient separation between the first sides (20, 26) of the first and second electrodes (18, 24) to avoid cross-gas contamination (a situation where the first and second constituent gases come into contact with each other, and become mixed), allow a sufficient volume of electrolytic solution to contact the whole first side of the electrodes, and to maintain a relatively constant flow rate of electrolytic solution over the whole first side of the electrodes, whilst simultaneously being close enough to each other to prevent a large ohmic resistance that would impede electrolysis efficiency. The current density may further be influenced by the use of suitable catalysts. A build-up of constituent gases within the electrode gap negatively impacts on the current density over the first and second electrodes (18, 24). Therefore, the removal of the first and second constituent gases from the first and second electrodes (18, 24) by the diverging outlet streams (50, 52), positively impacts on the current density over the first and second electrodes (18, 24).

The first electrode 18 is mounted to a first electrode housing 66, while the second electrode 24 is mounted to a second electrode housing 68. The first and second electrode housings (66, 68) may be manufactured from a non-conductive material. The first and second non-conductive housings (66, 68) each have an outer surface (70 and 72 respectively) within the inlet chamber. The first and second housings (66, 68) keep the first and second electrodes (18, 24) in place within the inlet chamber 12.

Alternatively, the first and second electrode housings (66, 68) may be manufactured from a conductive material, to serve as a current distributor for the electrodes. When the first and second electrode housings are manufactured from a conductive material, the outer surfaces (70, 72) are coated with a non-conductive coating.

The first and second electrode housings (66, 68) comprise inner formations (74 and 76 respectively) and outer formations (78 and 80 respectively). The inner and outer formations (74, 76, 78, 80) define an inner and an outer housing gap (82 and 84 respectively) therebetween. The sizes of the inner and outer housing gaps (82, 84) are substantially similar to the size of the electrode gap 32.

As is best illustrated in FIG. 1, the inner housing gap 82 is formed adjacent the electrode gap 32 towards the inner region 16 of the inlet chamber 12 and the outer housing gap 84 is formed adjacent the electrode gap 32 towards the outer region 14 of the inlet chamber 12.

The outer surfaces (70, 72) of the first and second electrode housings (66, 68) have smooth surface finishes, and are flush with the first sides (20, 26) of the first and second electrodes (18, 24). The inner and outer formations (74, 76, 78, 80) are long enough to ensure that the first and second peripheral streams (46, 48) are fully developed upon entering the electrode gap 32. The fully developed flow of the first and second peripheral streams (46, 48) is circumferential, radial and non-preferential flow. The inner and outer peripheral flows have substantially equal flow velocities.

The first and second electrode housings (66, 68) have rounded edges to reduce turbulence of the first and second peripheral streams (46, 48) upon entering the inner and outer housing gaps. Furthermore, the inlet chamber is provided without any sharp edges, to avoid turbulence of the electrolytic solution, which destabilises the gaseous meniscus.

When the first and second electrode housings (66, 68) are manufactured from a non-conductive material, the first and second electrodes (18, 24) are mounted within the first and second electrode housings (66, 68) in contact with first and second current distributors (not shown). The first and second current distributors impart a positive and negative charge on the first and second electrodes (18, 24) respectively, to create a potential difference between or over the first and second electrodes (18, 24). In use therefore, the first electrode may be an anode, while the second electrode may be a cathode. The first and second current distributors are connected to first and second current conducting rods (90, 92), that extends through a part of a body of the cell 10, to outside the cell 10.

The efficiency of the cell 10 is dependent thereon that the flow of electrolytic solution over the electrodes (18, 24), is as constant as possible. No-flow zones, or areas that experience higher or lower flow rates of electrolytic solution need to be avoided. Since the length of the outer periphery of the first and second electrodes (18, 24) necessarily differ from the length of the inner periphery of thereof, the total flow rate of the first peripheral stream 46 needs to exceed the total flow rate of the second peripheral stream 48.

Therefore, the total volumetric flow rate of the first stream of electrolytic solution 42 into the outer region 14 through the first inlet 34 exceeds the volumetric flow rate of the second stream of electrolytic solution 44 into the inner region 16 through the second inlet 36 by a volumetric flow factor. The volumetric flow factor is equal to a ratio of the outer peripheral length of the electrode, to the inner peripheral length of the electrode. In the case of ring-shaped electrodes, the volumetric flow factor can be simplified to a ratio of the outer diameter 60 to the inner diameter 58 of the electrode.

The volumetric flow factor is required to ensure that the magnitude of flow velocity vectors of the first peripheral stream into the electrode gap is equal to or at least substantially equal to the magnitude of flow velocity vectors of the second peripheral stream into the electrode gap. However, should the need arise (such as during the removal of gases not separated into the first and second outlets as discussed further below) the flow velocity vectors of the second peripheral stream may slightly exceed that of the first peripheral stream.

A single supply pump (not shown) is utilised to supply the first and second streams of electrolytic solution (42, 44) through the first and second inlets (34, 36) simultaneously.

The difference in volumetric flow rates as described above may be achieved by throttling the second stream 44 through the second inlet 36 by way of an orifice plate or valve (not shown); by designing the cell such that a cross-sectional area of the first inlet 34 exceeds a cross-sectional area of the second inlet 36; or by providing more than one first inlet 34 into the outer region 14. In use, the electrolytic solution pressure within the outer region 14 may be substantially equal to that within the inner region 16.

In the current example embodiment, a flow velocity of the first and second streams of electrolytic solution (42, 44) may be maintained within a range of 0.5 and 2 m·s$^{-1}$. Preferably, the flow velocity of the first and second streams of electrolytic solution (42, 44) is maintained around 1.1 m·s$^{-1}$. Generally, the velocity is limited to prevent too large a pressure drop within the apparatus.

Resultantly, the average flow velocity of electrolytic solution through a cross sectional front face of the electrodes is maintained within the range of 0.05 to 0.15 m·s$^{-1}$. Preferably, this flow velocity is maintained at 0.075 m·s$^{-1}$.

The first and second outlets (38, 40) are arranged in fluid flow communication with first and second outlet collectors (39, 41). The sizes of the first and second outlets are selected to reduce back-pressure within the outlet collectors. The pressure in the first and second outlet collectors (39, 41) is therefore below the inlet chamber pressure, so that a pressure gradient is formed over the electrodes, driving or facilitating the flow of electrolytic solution into the first and second outlet collectors (39, 41) respectively. A first and second outlet chamber (not shown) is provided in fluid flow communication with the first and second outlet collectors and first and second outlets. The first and second outlet chambers are provided with a first and second gas separator (not shown) respectively, to remove the first and second constituent gases from the first and second bi-phase streams (54, 56) respectively.

Further outlets may be provided in fluid flow communication with the first and second outlet collector (39, 41). The further outlets are provided to enhance flow within the outlet collectors and to ensure that the pressure gradient may be maintained over the electrodes. The further outlets become especially necessary where the outer diameters of the electrodes become relatively large, or where a second or further sets of electrodes are provided concentrically around the first and second electrodes and within the cell 10.

The separated first and second constituent gases may be collected and stored in first and second storage containers (not shown).

The electrolytic solution may be an alkaline electrolytic solution, namely one of potassium hydroxide (KOH) and sodium hydroxide (NaOH). The first constituent gas may be oxygen and the second constituent gas may be hydrogen.

A small portion of the first and second constituent gases forming on the first and second electrodes (18, 24) are not separated into the first or second outlets (38, 40) and remain within the electrode gap 32 or migrate from the electrode gap 32 towards the outer region 14 of the inlet chamber 12. This portion of constituent gases may eventually be transported with one of the first or second outlet streams into one of the first and second outlets (38, 40), and may therefore result in cross-gas contamination, reducing the purity of the collected first and second constituent gases, thereby reducing the efficiency of the cell 10.

This portion of constituent gases coalesce to form bubbles comprising any one or a combination of the constituent gases. When the size of the bubbles exceeds the size of the apertures of the electrodes, adhesion and buoyancy forces of the bubbles inhibit the bubbles from passing through the electrodes with the first and second outlet streams respectively.

These bubbles therefore collect and grow within the inlet chamber. When these bubbles collect within the electrode gap, they may cause void fracture, cross-gas contamination, and inactive electrode surface areas.

Generally, buoyancy forces the bubbles towards an operatively upper region of the inlet chamber.

It was found that the negative effects of the aforementioned can be eliminated or at least reduced by removing this portion of constituent gases from the outer region 14 of the inlet chamber 12.

For this purpose, a collection cavity 94 is provided towards this operative upper region of the outer region 14 of the inlet chamber 12. The collection cavity 94 collects the portion of the first and second gases and the coalesced bubbles that are not separated and transported into the first and second outlets (38, 40).

A purge outlet 96 is provided in fluid flow communication with the collection cavity 94, for transporting the constituent gases gathering in the collection cavity 94 out of the inlet chamber 12. In use, a third outlet stream 98 therefore flows from the inlet chamber 12, and through the purge outlet 96. The third outlet stream 98 may comprise a third bi-phase flow, depending on the presence of constituent gases that formed in the collection cavity 94. The first and second constituent gases are removed from the third bi-phase flow, and disposed of, whereafter the remaining electrolytic solution may be reintroduced into the inlet chamber via the first and/or second inlets (34, 36).

In use, the supply of current to the electrodes may be pulsed. This may firstly enhance the removal of the first and second constituent gases from the first and second electrodes into the first and second outlet collectors respectively and may secondly enhance the migration of the bubbles of unseparated constituent gases as aforementioned towards the collection cavity 94.

It will be understood that the use of the collection cavity 94 and the purge outlet 96 in order to achieve higher purity levels of collected constituent gases, is capable of being utilised in other electrolysing cells and apparatuses, such as that disclosed in patent '298 and other known alkaline or acidic electrolysing cells including electrolysing cells utilising diaphragms, PEMs and AEMs. The combination of patent '298 or these known electrolysing cells, and the currently disclosed collection cavity 94 and purge outlet 96 therefore falls within the scope of the current invention.

The cell 10 typically comprises a third inlet 35 that provides a third inlet 43 stream of electrolytic solution into the outer region 14, and a fourth inlet 45 that provides a fourth inlet stream 47 of electrolytic solution into the inner region 14. A counter-current flow of electrolytic solution into the outer region is established by means of the first and third inlet streams. The second and fourth inlet streams both provide the inner region 16 with a positive flow of electrolytic solution.

The electrolytic solution entering the inner region from two sides, and the counter-current flow of the electrolytic solution into the outer region, results in a uniform pressure within the inlet chamber, to encourage the uniformity of the peripheral flow into the electrode gap.

In cases where the outer diameters of the first and second electrodes become excessively large, electrolytic solution pressure differences between operative bottom and top regions of the inlet chamber, may negate the provision of steady, non-preferential flow along the whole periphery of the electrodes. In such cases, the outer region 14 of the inlet chamber may be provided with distribution channels (not shown) for transporting electrolytic solution to different and distinct portions along the periphery of the electrodes, to ensure that the flow rates, and electrolytic solution pressure within these portions are maintained as close as possible to each other. In this way the flow of electrolytic solution in these portions are balanced.

Injection of electrolytic solution into the inlet chamber is not directed directly at the electrode gap, to prevent disturbing the gaseous meniscus within the electrode gap.

The inlet chamber 12 is defined within a cell body 100, which is manufactured from a non-conductive material. Preferably, the cell body 100 is manufactured from polypropylene or another suitable polymeric material. The cell body 100 may be formed by stacking a first outer plate 102, a central plate 104 and a second outer plate 106 together. Ethylene propylene diene monomer (EPDM) rubber seals may be provided between the central plate 104 and the first and second outer plates (102, 106) respectively. The first and second electrode housings (66, 68), as well as the first and second current distributors may be held in position by the first and second outer plates (102, 106) respectively.

Figure 5:
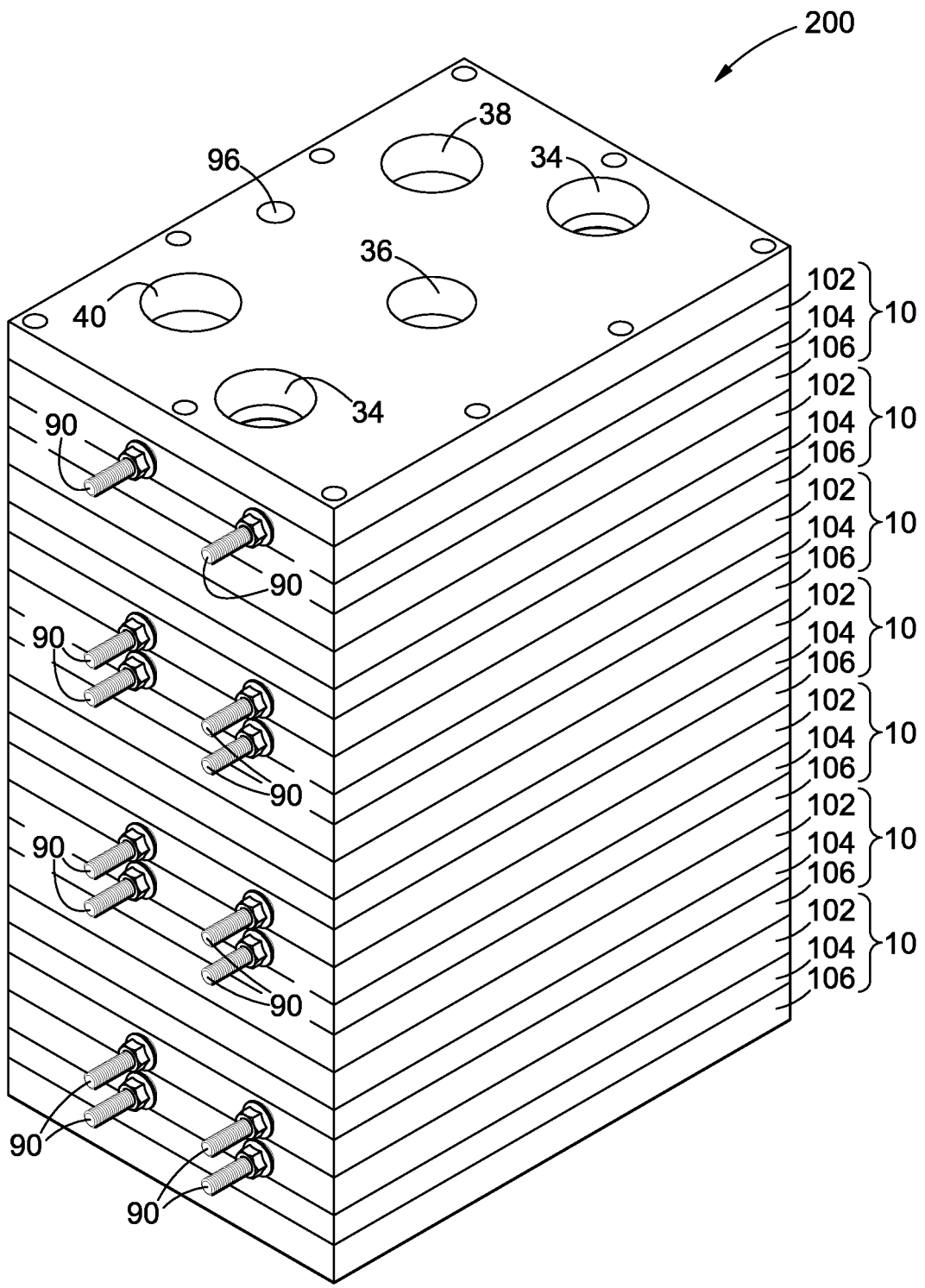
FIG. 5 is a perspective view of a stack formed by a plurality of electrolysing apparatuses similar to the electrolysing apparatus of FIG. 1.

The respective inlets and outlets may be formed within the central and outer plates (102, 104, 106) so a stack 200 may be formed by a plurality of cells 100, stacked together and used in a reactor system. The stack 200 may be formed by stacking the first outer plates 102 of two adjacent cells 10 in contact with each other and the second outer plates 106 two adjacent cells 10 in contact with each other. A first end plate (shown in FIG. 5) may be stacked in contact with the first outer plate 102 of the first cell 10 of the stack 200, while a second end plate (not shown) may be stacked in contact with the second outer plate 106 of the last cell 10 of the stack 200. The arrangement may be such that all of the first inlets 34 of the cells 10 within the stack 200 are in fluid flow communication. Similarly, the second inlets 36 of each cell 10 in the stack 200 may be arranged in fluid flow communication with one another, the first outlets 38 of each cell 10 in the stack 200 may be arranged in fluid flow communication with one another, the second outlets 40 of each cell 10 in the stack 200 may be arranged in fluid flow communication with one another, and the purge outlets 96 of each cell 10 in the stack 200 may be arranged in fluid flow communication with one another. It will be appreciated that the stack in FIG. 5 is shown standing on its side, and that the stack 200, in use, will be arranged such that the plates are arranged substantially vertically, so that purge outlet 96 is arranged at the top of the stack.

Preferably, the stack 200 may comprise of seven cells 10 stacked together as mentioned above. A single supply pump (not shown) may be utilised to supply electrolytic solution to the first and second inlets (34, 36) of all of the cells 10 that make up the stack 200. When only a single cell 10 is utilised in an electrolysing system, a supply pump (not shown) is also utilised to supply electrolytic solution to the first and second inlets (34, 36) of the cell 10.

In an alternative embodiment, which is not shown, a stack may be formed by a plurality of bi-polar plates. In such a configuration, only the outer-most plates are connected to the electric source. This configuration therefore reduces the hardware requirements of the stack. Also, when using a bi-polar stack configuration, amperages of the stack is similar to amperages of a single cell, while the total voltage requirement of the stack equals a sum of individual cell voltages. This means that the required amperage is reduced when using a bi-polar plate stack design, which positively impacts on the cost of current distribution hardware.

Each first or second electrode forming part of the stack is provided in contact with a respective side of one of the bi-polar plates. It will therefore be understood that a single bi-polar plate is associated with a first electrode on a first side thereof, and a second electrode on a second side thereof.

Figure 6:
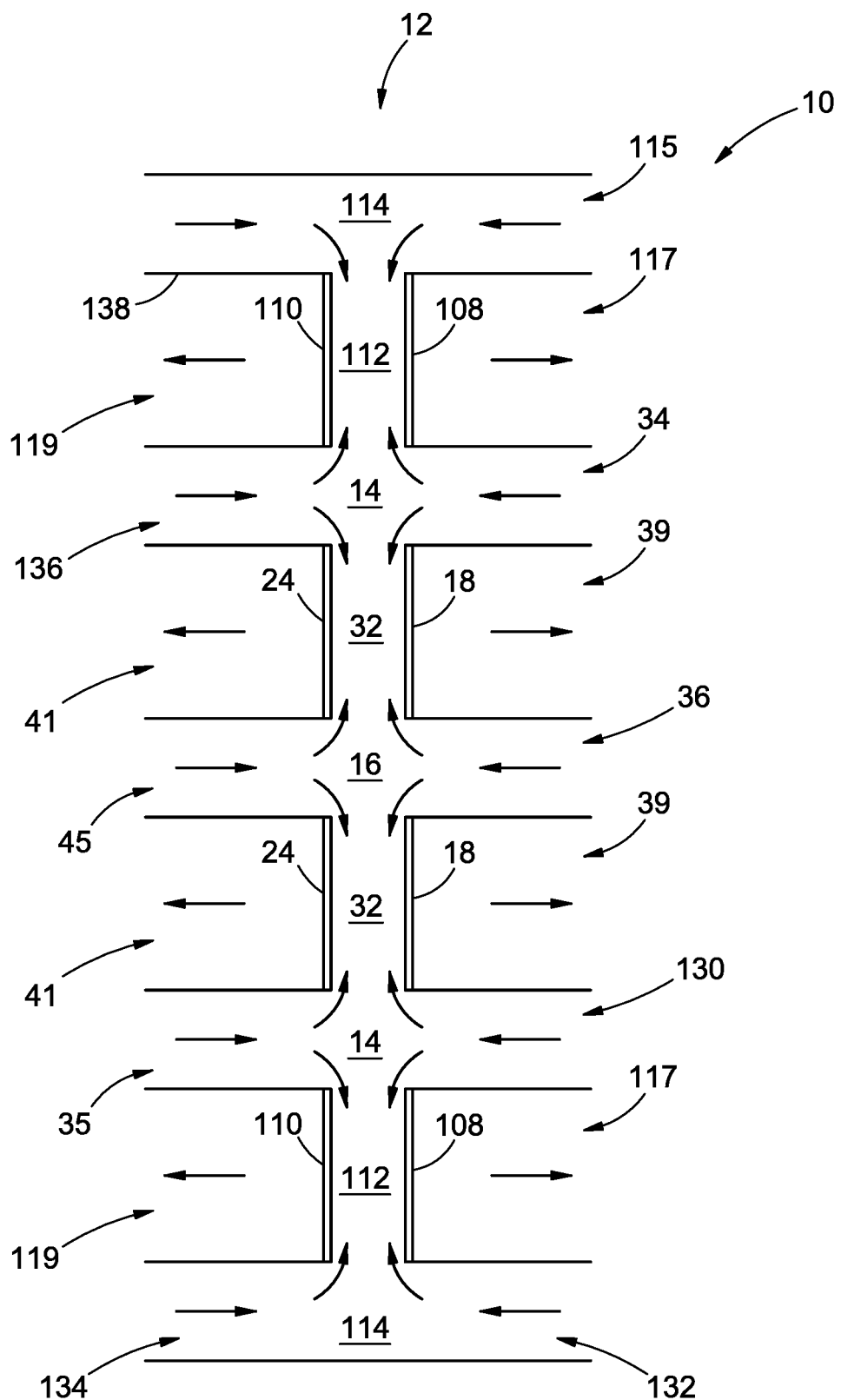
FIG. 6 is a diagrammatic section view of an inlet chamber of another example electrolysing cell or apparatus according to the invention, wherein a second pair of electrodes is provided to surround the first pair of electrodes.

In order to further increase the effective electrode surface area, a third and fourth permeable electrode (shown as 108 and 110 in FIGS. 6 and 7) may be provided. Each of the third and fourth electrodes (108, 110) defines an internal aperture that surrounds the outer region 14 of the inlet chamber 12. Similar to the first and second electrodes (18, 24) the third and fourth electrodes (108, 110) are arranged to face each other to define a second electrode gap 112. The inlet chamber 10 now furthermore comprises an outermost region 114 that surrounds the third and fourth electrodes (108, 110). An inlet 115 provides an inlet stream of electrolytic solution to the outermost region 114.

In use, the third and fourth electrodes are therefore submerged in electrolytic solution. A third and fourth outlet (116, 118) is provided in fluid flow communication with third and fourth outlet collectors (117, 119), which are in turn provided in fluid flow communication with the third and fourth electrodes (108, 110) respectively. It will be appreciated that the formation and separation of constituent gases on, and the flow of electrolytic solution through the third and fourth electrodes (108, 110) are substantially similar as in the case of the first and second electrodes (18, 24). The first and third electrodes (18, 108) are arranged substantially concentrically, while the second and fourth electrodes (24, 110) are arranged substantially concentrically. It will be understood that further sets of concentric electrodes may be provided.

Figure 7:
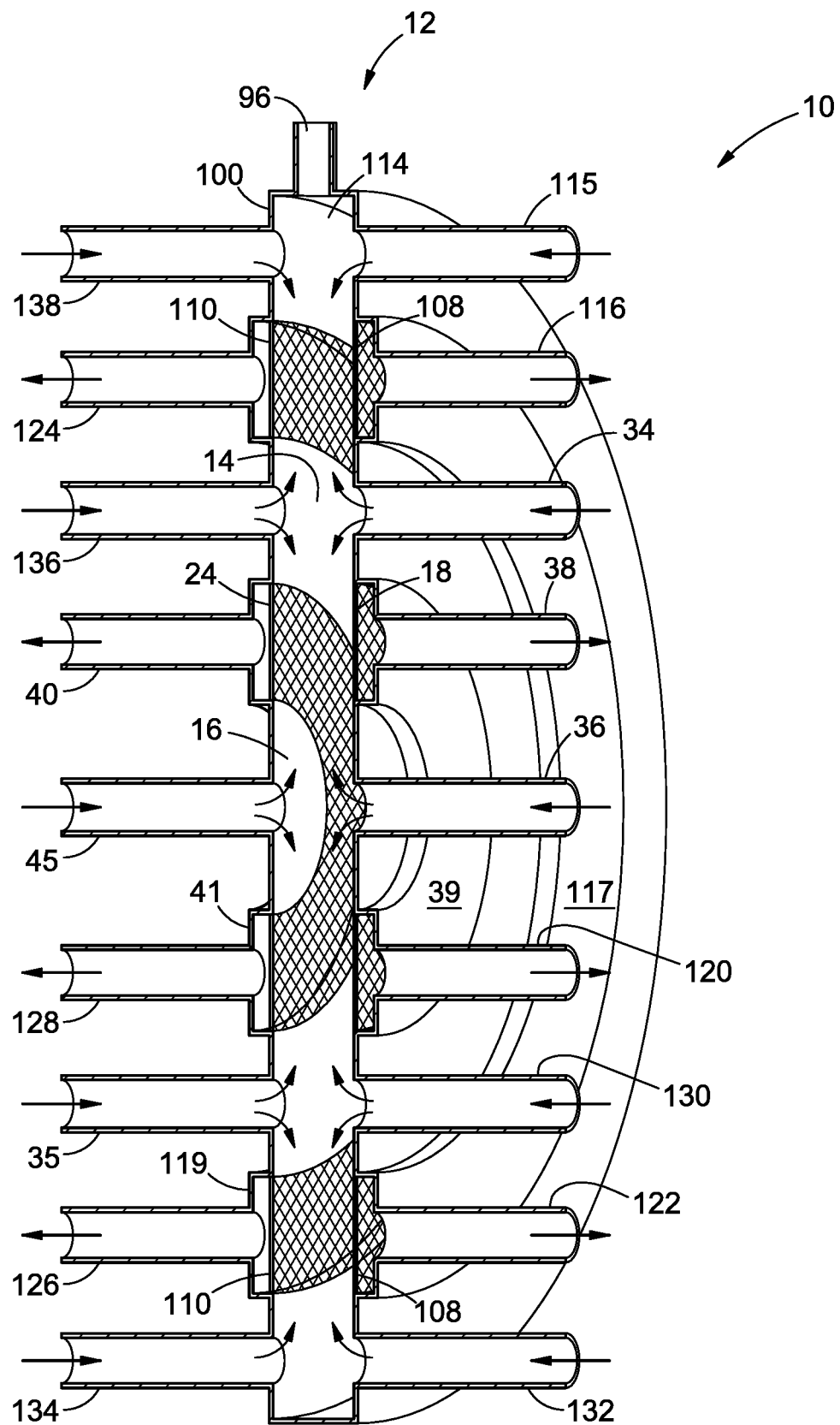
FIG. 7 is perspective section view of the electrolysing apparatus of FIG. 6.
Figure 8:
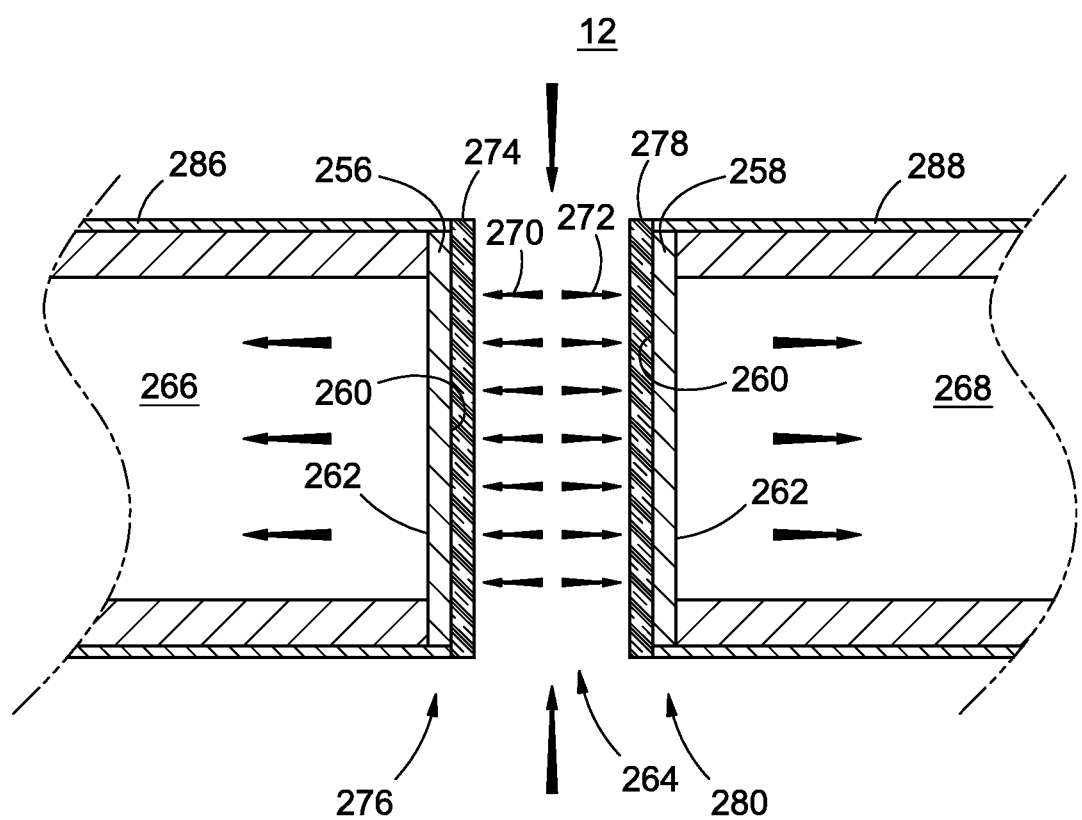
FIG. 8 is a diagrammatic section view of a pair of opposing electrode assemblies, defining an electrode gap within an inlet chamber of an electrolysis apparatus.
Figure 9:
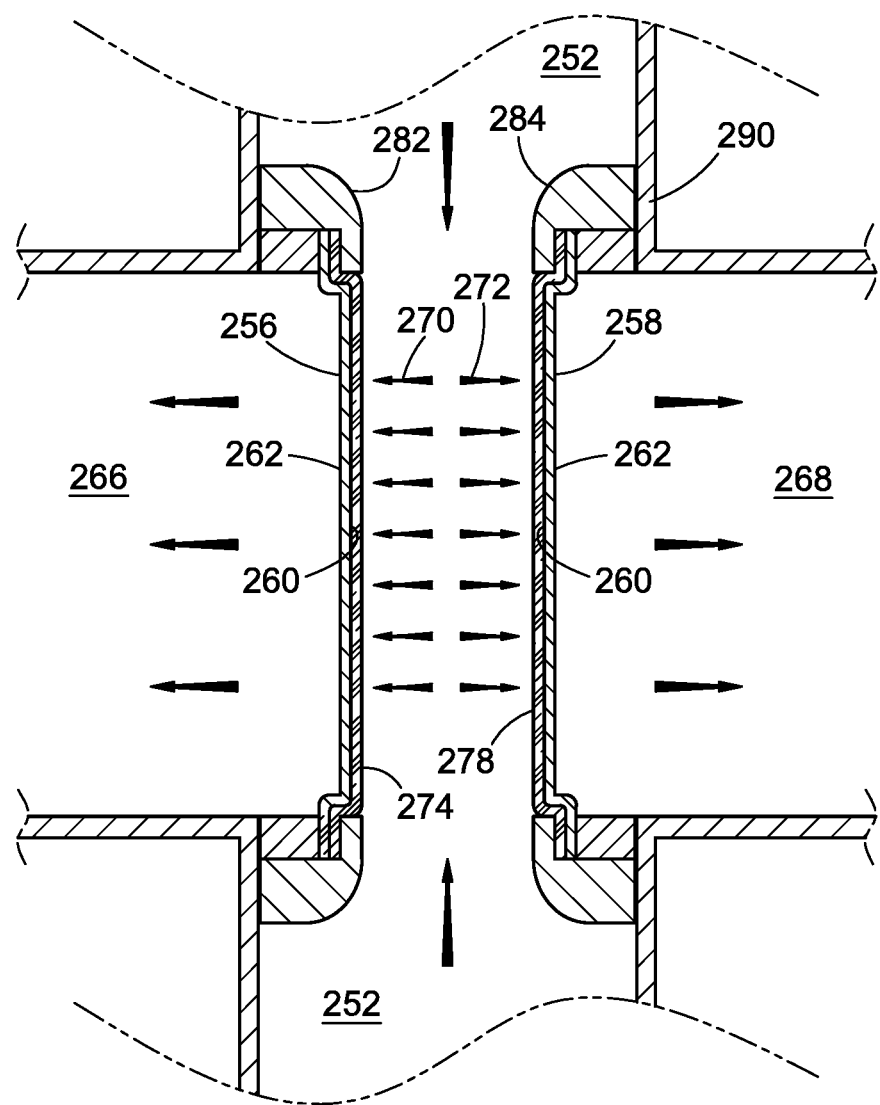
FIG. 9 is diagrammatic section view of an alternative example embodiment of the pair of opposing electrodes of FIG. 8.
Figure 10:
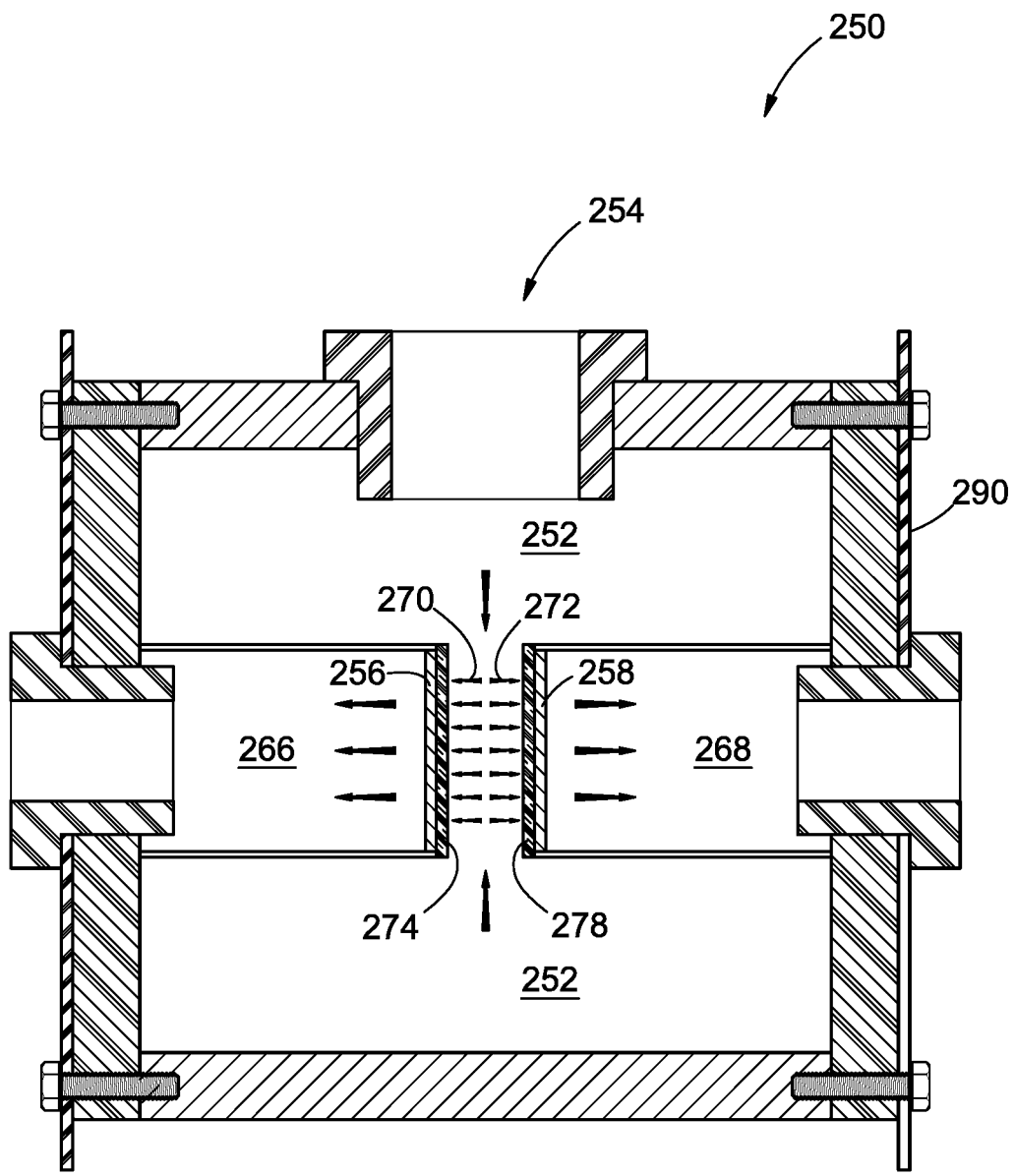
FIG. 10 is a diagrammatic section view of an electrolytic apparatus incorporating the pair of electrode assemblies of FIG. 8.

As shown in FIG. 7, further outlets (120, 122, 124, 126 and 128) may be provided in fluid flow communication with the respective outlet collectors as indicated. Furthermore, further inlets (130, 132, 134, 136 and 138) may be provided in fluid flow communication with the respective regions of the inlet chamber as indicated.

By providing electrodes with inner apertures, such as ring-shaped electrodes, the effective areas of the electrodes are significantly increased, without necessarily increasing the effective path length or the overall size of the cell. In this way, the current invention is able to achieve similar gas purities and efficiencies as the electrolysing cell of Patent '298, while increasing the volume of separated gases produced significantly. The volume of separated gases produced is furthermore advantageously increased significantly by providing further pairs of electrodes concentrically around the first and second electrodes.

By providing the collection cavity and purge outlet within the inlet chamber, the purity of collected first and second constituent gases can be ensured or improved.

It will be appreciated that the aforementioned example embodiments of the present invention present various advantages over the '298 patent, that are required to make gas production on a commercial scale viable.

It has however been found that, in certain circumstances, circulation of the electrolytic solution through the apparatus 10 at flow velocities as mentioned, causes too high a parasitic load on the apparatus 10, rendering the production and separation of gases by means of the apparatus 10, inefficient.

The embodiments that are described below, and shown in FIGS. 8 to 11, sets out to reduce the parasitic load associated with the supplying of the flow rates of electrolytic solution through the apparatus 10.

In these figures, an electrolysing apparatus or cell for the production and separation of gases by electrolysis of an electrolytic solution is generally indicated with reference numeral 250.

Figure 11:
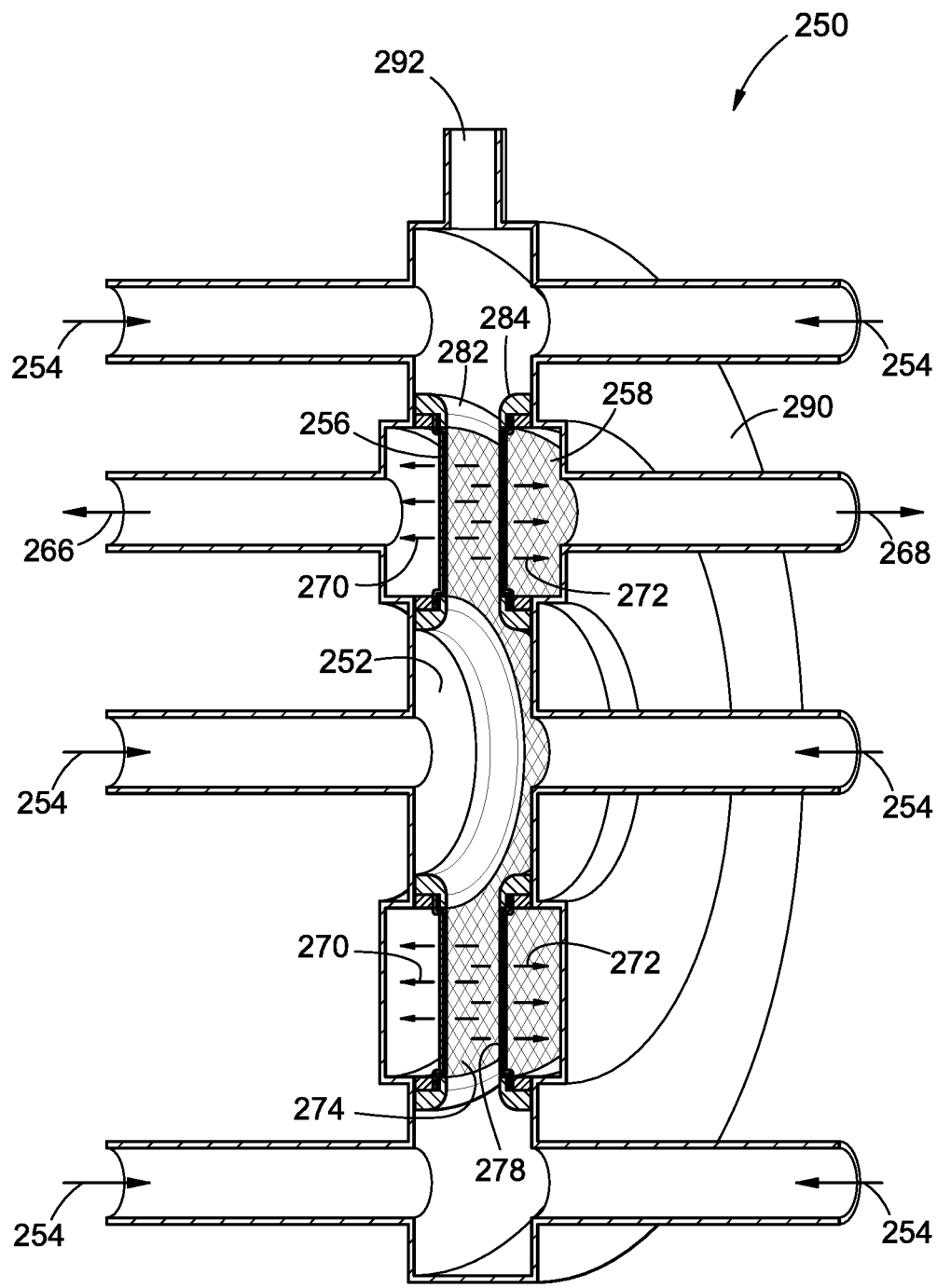
FIG. 11 is a diagrammatic section view of an electrolytic apparatus incorporating the pair of electrode assemblies of FIG. 9.

The apparatus 250 comprises an inlet chamber 252 for operatively receiving electrolytic solution through an inlet 254. A first permeable electrode 256 and second permeable electrode 258 are arranged within the inlet chamber 252, and are in use, submerged in electrolytic solution. As best shown in FIG. 11, the first and second electrodes (256, 258) have first and second sides (260, 262). The first sides (260) of the first and second electrodes (256, 258) are arranged to face each other and are spaced apart to define an electrode gap 264.

The second side 262 of the first electrode 256 is arranged in fluid flow communication with a first outlet 266, whilst the second side 262 of the second electrode is arranged in fluid flow communication with a second outlet 268. Since the first and second electrodes (256, 258) are permeable, electrolytic solution within the inlet chamber 252 enters into the electrode gap 264, where it diverges into a first outlet stream 270 that flows through the first electrode 256 into the first outlet, and a second outlet stream 272 that flows from the electrode gap 264 through the second electrode 258 into the second outlet.

A first non-conductive permeable sheet 274 is arranged over the first side 260 of the first electrode 256. The first permeable electrode 256 and the first non-conductive permeable sheet 274 collectively constitute a first electrode assembly 276.

Similarly, a second non-conductive permeable sheet 278 is arranged over the first side 260 of the second electrode 258. The second permeable electrode 258 and the second non-conductive permeable sheet 278 collectively constitute a second electrode assembly 280.

The first and second electrode assemblies (276, 280) may be substantially similar, and forms a pair of electrode assemblies, used in the apparatus 250.

The electrode gap 264 is therefore defined between the electrode assemblies (276, 280) and ranges between 0.5 mm to 6 mm. Preferably, the electrode gap ranges between 1 mm and 4 mm. Electrode gaps of between 1 mm and 2.5 mm have shown efficient performance while preventing undue reductions in current densities.

The first and second non-conductive permeable sheets (274, 278) are permeable to both gases and liquids, so that the first and second streams (270, 272) are capable of passing through them.

The first and second non-conductive permeable sheets (274, 278) serve the purpose of inhibiting constituent gases formed on the first and second permeable electrodes (256, 258) (as more fully described below) from entering into the electrode gap 264.

The mechanism by which constituent gases are inhibited by the first and second non-conductive permeable sheets (274, 278) from entering or migrating into the electrode gap 264, is a combination of adhesion forces in the bubbles of constituent gases as the bubbles interact with the non-conductive permeable sheet, buoyancy forces of the bubbles, and the drag caused by the positive flow of the first and second outlet streams (270, 272) through the first and second non-conductive permeable sheets (274, 278) respectively. The non-conductive permeable sheets (274, 278) furthermore reduces electrolytic reaction on the first sides 260 of the electrodes (256, 258) thereby directing gas formation towards the second sides 262 of the electrodes (256, 258), whilst adding a pressure requirement that gas bubbles need to overcome in order to migrate into the electrode gap 264. As described more fully below, the aperture size of the non-conductive permeable members is selected based on the type of constituent gas and bubble-size classification of the apparatus.

Features of the first non-conductive permeable sheet 274 will now further be elaborated on. It will be appreciated that the second non-conductive permeable sheet 278 is similar to the first non-conductive permeable sheet 274.

The first non-conductive permeable sheet 274 comprises a textile-type mesh weave in the form of any one of a straight weave, plain weave, Dutch weave, twilled weave or a combination of the aforementioned. The sheet 274 is manufactured from a plastics material or polymeric material, such as Nylon, polytetrafluoroethylene (PTFE), polypropylene (PP), high-density polyethylene (HDPE) or polyvinyl chloride (PVC).

Generally, the aperture size of the sheet 274 ranges between 5 and 75 µm and is selected to be smaller than an average or majority size of evolved bubbles forming on the first electrode 256. Typically, the aperture size of the non-conductive permeable sheet 274 is smaller than an aperture size of the first permeable electrode 256. It has been found that, at optimal flow rates (as more fully discussed below), an aperture size of the non-conductive permeable sheet 274 of 25 µm inhibits a sufficient portion of the constituent gases formed on the first electrode 256.

It should be borne in mind that the non-conductive permeable sheet 274 increases resistance to flow of the first outlet stream through the first electrode assembly, while simultaneously, slightly decreases the effective electrode surface area available for electrolytic action. This has to be considered in light of decreased pumping requirements associated with lower flow rates of electrolytic solution and high gas purities.

The first non-conductive permeable sheet 274 is between 50 and 85 µm thick, and preferably, between 66 and 78 µm thick.

The first non-conductive permeable sheet 274 has a similar shape as the electrode, and is large enough to cover the whole first side 260 of the first electrode 256. The first non-conductive permeable sheet 274 is fixed relative to the first electrode 256 by a lock ring 282, which stretches the sheet over the first electrode 256, and so, the first side 260 of the first electrode and the first non-conductive permeable sheet 274 is arranged in direct physical contact with each other.

A second lock ring 284 is provided to fix the second non-conductive permeable sheet 278 relative to the second electrode 258.

The first and second permeable electrodes (256, 258) are manufactured from a base material such as: titanium; nickel; carbon; cobalt; platinum; platinum group metals (PGMs); aluminium; ferrous alloys (such as steel or stainless steel); or an alloy or combination thereof.

The electrodes (256, 258) may comprise an outer layer of a suitable catalytic material. The outer layer may be formed by way of an electrodeposition method onto the base material. Alternatively, the outer layer may be formed by alternative known methods such as spray or dip coating, vapour deposition or vacuum metallization. The permeable electrodes (256, 258) may be foraminous, porous or perforated.

A nominal micron rating of the electrodes (256, 258) ranges between 25 and 200 µm. However, preferably, the nominal micron rating of the electrode exceeds 80 µm. The electrode may comprise an alternate filtration mesh weave, an electroformed mesh or a resolving filtration mesh. The mesh weave of the electrode may comprise one of a straight weave, plain weave, Dutch weave, twilled weave and a combination thereof.

Alternatively, the first and second electrodes (256, 258) may comprise a metal foam. Further alternatively, the first and second electrodes (256, 258) may comprise a multi-layered filtration mesh, in which case a mesh with a lower associated pressure drop, or a greater aperture rating will be used.

Further alternatively, a combination of a filtration mesh and a metallic foam may be used, wherein the mesh is arranged towards the first side 260 of the electrode, and the metallic foam is arranged towards the second side 262 thereof.

Especially in the case of a multi-layered mesh, increased back-pressure in the outlets (266, 268) needs to be avoided to avoid constituent gas build up between the layers of the mesh, which would result in a decrease in active electrode surface area. The size of perforations in the multi-layered mesh are therefore selected to prevent a pressure build-up. Also, the multi-layer mesh may comprise different mesh types, such as a layer of plain weave followed by a layer of Dutch weave.

The first and second electrodes (256, 258) may be shaped to be used in conventional electrolysis apparatuses that do not require the use of membranes or diaphragms, and particularly those described more fully in the '298 patent. Therefore, the electrodes (256, 258) may be round, rectangular, square, or may comprise continuous bands which may be ring shaped, substantially oval or rectangular.

In use, electrolysis ensues when a potential difference is supplied over the first and second electrodes (256, 258), whereafter first and second constituent gases form on the first and second electrodes (256, 258) respectively. The first and second outlet streams (270, 272) passing into the first and second outlets (266, 268) removes the first and second constituent gases from the first and second electrodes (256, 258). By providing the first and second non-conductive permeable sheets (274, 278) over the first and second electrodes (256, 258), the flow rate of the first and second outlet streams (270, 272) can be significantly reduced whilst still ensuring effective separation of the first and second constituent gases. The flow velocity of the first and second outlet streams (270, 272) through the electrodes ranges between 0.0001 and 0.012 m/s.

The electrolytic solution within the electrode gap may be maintained at a temperature ranging between 30 and 150 degrees Celsius, whilst the pressure of the electrolytic solution within the inlet chamber 252 is maintained at a pressure between atmospheric pressure and 30 bar.

The first and second electrodes (256, 258) are mounted to first and second non-conductive electrode housings (286, 288) located within an apparatus body 290, which is manufactured from a non-conductive material.

First and second current distributors (not shown) supply the first and second electrodes (256, 258) with a negative and positive charge respectively. Alternatively, the electrodes may be mounted to bipolar plates (not shown), and a potential difference may be applied to endplates of the apparatus.

The first and second outlets (266, 268) are arranged in fluid flow communication with first and second outlet collectors (not shown) that are maintained at a pressure below a pressure inside the inlet chamber. Consequently, a pressure gradient or differential exists over the first and second electrodes (256, 258) which facilitates the flow of the first and second outlet streams.

A first and second gas separator (not shown) may be provided in the first and second outlet collectors respectively, to separate the first and second constituent gases having been removed from the first and second electrodes, from the first and second outlet streams respectively.

The separated first and second constituent gases are collected and stored.

The electrolytic solution is an alkaline electrolytic solution, such as potassium hydroxide (KOH) and sodium hydroxide (NaOH). The concentration of potassium hydroxide is between 25 and 30%. The first constituent gas may be hydrogen and the second constituent gas may be oxygen. Alternatively, the electrolytic solution may be a neutral, acidic or brine solution or seawater. It will be understood that, in cases where the electrolytic solution is a brine solution, acidic solution or seawater, the electrode material will be changed to account for such electrolytic solution. In such cases, the electrodes will typically be manufactured from tungsten or stainless steel. The non-conductive permeable sheets (274, 278) may furthermore serve the purpose of preventing build-up of scale or other contaminants on the surfaces of the first and second electrodes (256, 258).

In the case of ring-shaped electrodes, electrolytic solution may enter the electrode gap either from both inner and outer periphery of the electrode gap, or only from an inner periphery of the electrode gap. In the latter case, the inlet chamber 252 would therefore be surrounded by the ring-shaped electrodes, and only an inner-peripheral stream of electrolytic solution will enter the electrode gap. It will be appreciated that the addition of the non-conductive permeable layer to the electrodes, removes, to an extent, the limitation on the permissible path length of the electrolytic solution within the electrode gap. Therefore, in the case of ring-shaped electrodes used with the apparatus 250, a radial extent (similar to the radial extent 62 described in relation to the apparatus 10) may exceed 50 mm.

The provision of the potential difference over the first and second electrodes (256, 258) may be pulsed to further facilitate the removal of the first and second constituent gases from the first and second electrodes respectively, while the positive flow of electrolytic solution, and therefore the diverging first and second streams continue.

A stack (not shown) may be formed by a plurality of apparatuses 250. Preferably, the stack may comprise a filter press design. The first and second outlets (266, 268) of each respective apparatus 250 forming part of the stack may be connected via a first and second manifold (not shown) respectively, to a main first outlet of the stack and a main second outlet of the stack.

By decreasing the flow velocities of the first and second outlet streams (270, 272), turbulence and the effect of fluid dynamics within the electrode gap is significantly reduced. Consequently, the applicant foresees that the flow path length of the apparatus 250 may advantageously be increased, to increase the effective electrode area per unit apparatus volume. Also, by inhibiting the migration of constituent gases into the electrode gap, the accumulation of constituent gases on the first sides of the electrodes is reduced. Consequently, cross contamination of the constituent gases is reduced, and desirable purity levels of the separated constituent gases are maintained. The apparatus 250 yields purity levels above 99 vol %.

An operative top end of the outer region of the inlet chamber 252 may comprise a collection cavity for collecting constituent gases that form within the inlet chamber 252 and that are not separated into the first or second outlets. Buoyancy forces may force the gases that are not separated into the first or second outlets through the first and second electrodes, towards the collection cavity, in order to prevent a build-up of gases between the electrodes, thereby preventing cross-gas contamination of gases between the electrodes.

A purge outlet 292 may be provided in fluid flow communication with the collection cavity for removing constituent gases having collected in the collection cavity from the inlet chamber 252.

Without the use of the first and second non-conductive permeable sheets (274 and 278), the apparatus 252 is capable of a maximum predicted overall system theoretical higher heating value efficiency of 42 HHV %. However, by incorporating the first and second non-conductive permeable sheets (274 and 278) in the apparatus 10 as herein described, an overall system higher heating value efficiency of between 50 and 60 HHV % can be obtained. The applicant foresees that further reductions in flow rate, or further development on the type of non-conductive permeable sheet, and the aperture size thereof, may increase the overall system higher heating value efficiency to above 60 HHV %.

It will be appreciated that the non-conductive permeable sheets (274, 278) differ fundamentally from membranes and diaphragms, in that the non-conductive permeable sheets (274, 278):

are not solid polymeric substances (as is the case with membranes);

have perforations which far exceed the size of pores/channels present in diaphragms;

do not contain organic or inorganic hydrophilic fillers and solvents or current carriers;

have well defined apertures instead of random and irregular pores or pathways (as is the case with diaphragms);

are permeable to both liquids and constituent gases;

have a distinctly different function in an electrolysis cell according to the current invention than would be the case in a conventional (i.e. diaphragm or membrane containing) electrolysis cell of the first class referred to elsewhere in this specification; and are not doped with any additional chemical substances.

Therefore, in the absence of positive flow of electrolytic solution through the non-conductive permeable sheets (274, 278), the constituent gases might well migrate into the electrode gap 264. It is therefore the combination of positive flow of electrolytic solution and the interaction of the gas bubbles with the non-conductive permeable sheets (274, 278) that inhibits migration into the electrode gap. The non-conductive permeable sheets (274, 278) however allows a significant reduction in flowrates whilst still achieving effective separation of constituent gases.

A larger aperture size of the non-conductive permeable sheets (274, 278) results in better ionic transfer and therefore lower ohmic resistance over the sheets and causes less resistance to flow, but is less effective at inhibiting gas migration into the electrode gap 264. These factors need to be considered when selecting a suitable aperture size.

More than one inlet for electrolytic solution may be provided into the inlet chamber 252.

It will be appreciated by those skilled in the art that the invention is not limited to the precise details as described herein and that many variations are possible without departing from the scope and spirit of the current disclosure.

For example, the outer diameter 60 of the first electrode 18 of the apparatus 10 may be significantly increased to increase the production capability of the cell. Furthermore, the electrode gap 32 may be increased, with increased flow velocities of the first and second peripheral streams (46, 48) and an increased potential difference applied over the first and second electrodes (18, 24), so that the radial extent 62 may be increased beyond 50 mm.

Furthermore, an apparatus 250 wherein only the first electrode 256 is provided with a non-conductive permeable sheet 274, while the second electrode 258 is not provided with a non-conductive permeable sheet, is foreseeable. However, such an arrangement may not be as effective as the arrangement described above, since a second non-conductive permeable sheet adds an additional element of reliability in the separation of the constituent gases. Also, when a non-conductive permeable sheet is arranged over the cathode only, oxygen might yet enter the electrode gap (especially in cases of lower electrolytic flow rates), from where it might pass into the first outlet (as both the non-conductive permeable sheet and the first electrode are permeable to gases).

It will further be appreciated that the foregoing examples have been provided merely for the purposes of explanation and are in no way to be construed as limiting of the present invention. While the present invention has been described with reference to exemplary embodiments only, it is understood that the words which have been used herein are words of description and illustration, rather than words of limitation. The present invention is also not intended to be limited to the particulars disclosed herein. Rather, the present invention extends to all functionally equivalent structures, methods and uses, such as are within the scope of the invention.

The invention claimed is:

1. An apparatus for the production and separation of gases, by electrolysis of an electrolytic solution, the apparatus comprising:
   an inlet chamber comprising an inner and outer region;
   first and second permeable electrodes each having first and second sides in the form of a continuous band and defining an inner aperture surrounding the inner region, the first sides of the first and second electrodes arranged to face each other to define an electrode gap within the inlet chamber;
   a first electrolytic solution inlet into the outer region and a second electrolytic solution inlet into the inner region;
   a first outlet in fluid flow communication with the second side of the first electrode, and a second outlet in fluid flow communication with the second side of the second electrode,
so that, in use, a first peripheral flow of electrolytic solution ensues from the outer region into the electrode gap, and a second peripheral flow of electrolytic solution ensues from the inner region into the electrode gap, thereby immersing the electrodes in electrolytic solution, so that operatively, first and second constituent gases form on the first and second electrodes respectively, and wherein, in use, electrolytic solution within the electrode gap diverges into first and second outlet streams that pass through the first and second electrodes respectively, thereby removing at least a portion of the first and second constituent gases from the first and second electrodes into the first and second outlets respectively,
and further comprising a non-conductive permeable layer arranged over the first side of the first permeable electrode, wherein, in use, the non-conductive permeable layer inhibits the first constituent gas, having formed on the first electrode, from migrating into the electrode gap.

2. An apparatus according to claim 1, further comprising a second non-conductive permeable layer arranged over the first side of the second permeable electrode, wherein, in use, the second non-conductive permeable layer inhibits the second constituent gas, having formed on the second electrode, from migrating into the electrode gap.

3. An apparatus according to claim 1, wherein each of the first and second electrodes comprises a substantially ring-shaped band, defined by an inner and an outer diameter, and wherein a radial extent of the band is equal to, or below, 50 mm.

4. An apparatus according to claim 3, wherein the facing first sides of the first and second electrodes are arranged substantially parallel to each other, and wherein the electrode gap between the first sides of the first and second electrodes is in the range of 1 mm to 6 mm.

5. An apparatus according to claim 4, wherein the first and second electrodes are mounted to first and second non-conductive electrode housings located within an apparatus body.

6. An apparatus according to claim 5, wherein the electrode housings comprise inner and outer formations defining a housing gap, which housing gap is substantially equal to the electrode gap.

7. An apparatus according to claim 6, wherein a length of the inner and outer formations is selected to ensure that the flow of electrolytic solution is fully developed upon entering the electrode.

8. An apparatus according to claim 7, wherein an entry from the outer region of the inlet chamber into the outer formation of the electrode housing, and the entry from the inner region of the inlet chamber into the inner formation of the electrode housing, is rounded to reduce turbulence of electrolytic solution flowing into the housing gap, in use.

9. An apparatus according to claim 8, wherein the first and second electrodes are mounted in contact with first and second current distributors respectively, which first and second current distributors impart a positive and negative charge on the first and second electrodes respectively, to create a potential difference between the first and second electrodes.

10. An apparatus according to claim 9, wherein a cross-sectional area of the first inlet exceeds a cross-sectional area of the second inlet, to facilitate a volumetric flow rate of electrolytic solution into the outer region of the inlet chamber to exceed the volumetric flow rate of electrolytic solution into the inner region of the inlet chamber.

11. An apparatus according to claim 9, wherein more than one first inlet is provided into the outer region of the inlet chamber, to facilitate a volumetric flow rate of electrolytic solution into the outer region of the inlet chamber to exceed the volumetric flow rate of electrolytic solution into the inner region of the inlet chamber.

12. An apparatus according to claim 11, wherein the first and second outlets are arranged in fluid flow communication with first and second outlet collectors respectively.

13. An apparatus according to claim 12, wherein first and second outlet chambers are provided in fluid flow communication with the first and second outlet collectors, and wherein first and second gas separators are provided in the first and second outlet chambers respectively, to remove the first and second constituent gases from the first and second outlet streams respectively.

14. An apparatus according to claim 13, wherein the first constituent gas is hydrogen and the second constituent gas is oxygen, and wherein the electrolytic solution is one of: i) a neutral solution; ii) an acidic solution; iii) a brine solution; iv) seawater; and v) an alkaline electrolytic solution, namely one of potassium hydroxide (KOH) and sodium hydroxide (NaOH).

15. An apparatus according to claim 14, wherein an operative top end of the inlet chamber comprises a collection cavity for collecting constituent gases that operatively accumulate within the inlet chamber and which is in fluid flow communication with a purge outlet for removing the accumulated constituent gasses from the collection cavity.

16. An apparatus according to claim 15, wherein the apparatus comprises a third inlet into the outer chamber, and a fourth inlet into the inner chamber, and wherein, in use, a counter current flow of electrolytic solution is established through the first and third inlets into the outer region and wherein, both the second and fourth inlets provide the inner region with a positive flow of electrolytic solution.

17. An apparatus according to claim 16, wherein the outer region of the inlet chamber comprises distribution channels, in use, to distribute electrolytic solution to different portions along a periphery of the first and second electrodes, to provide balanced flow of electrolytic solution along the periphery of the first and second electrodes.

18. An apparatus according to claim 17, further comprising:
third and fourth permeable electrodes each having first and second sides and defining an inner aperture surrounding the outer region of the inlet chamber, the first sides of the third and fourth electrodes arranged to face each other to define a second electrode gap within the inlet chamber;
an outermost region of the inlet chamber surrounding the third and fourth electrodes;
a fifth inlet into the outermost region;
a third outlet in fluid flow communication with the second side of the third electrode, and a fourth outlet in fluid flow communication with the second side of the fourth electrode, so that, in use, a third peripheral flow of electrolytic solution ensues from the outer region into the second electrode gap, and a fourth peripheral flow of electrolytic solution ensues from the outermost region into the second electrode gap, thereby immersing the third and fourth electrodes in electrolytic solution, so that in use the first and second constituent gases form on the third and fourth electrodes respectively, and wherein, in use, electrolytic solution within the second electrode gap diverges into third and fourth outlet streams that pass through the third and fourth electrodes respectively, thereby removing the first and second constituent gases from the third and fourth electrodes into the third and fourth outlets respectively.

* * * * *

UNITED STATES PATENT AND TRADEMARK OFFICE
CERTIFICATE OF CORRECTION

| | | |
|---|---|---|
| PATENT NO. | : 12,157,948 B2 | Page 1 of 1 |
| APPLICATION NO. | : 17/050415 | |
| DATED | : December 3, 2024 | |
| INVENTOR(S) | : Cornelis Johannes De Jager, Ivor Malcolm Gillespie and Jason Raphael Cuomo | |

It is certified that error appears in the above-identified patent and that said Letters Patent is hereby corrected as shown below:

On the Title Page

Item (12), delete "De Jagar et al." and insert --De Jager et al.--, and Under Inventors, Item (72), first inventor, delete "Cornelis Johannes De Jagar" and insert --Cornelis Johannes De Jager--

Signed and Sealed this
Eighteenth Day of March, 2025

Coke Morgan Stewart
*Acting Director of the United States Patent and Trademark Office*